United States Patent [19]

Horike et al.

[11] 4,370,664
[45] Jan. 25, 1983

[54] INK JET PRINTING APPARATUS

[75] Inventors: Masanori Horike; Yutaka Yoshiba; Yutaka Ebi, all of Tokyo, Japan

[73] Assignee: Ricoh Company, Ltd., Tokyo, Japan

[21] Appl. No.: 250,464

[22] Filed: Apr. 3, 1981

[30] Foreign Application Priority Data

Apr. 14, 1980 [JP] Japan .................. 55-48882
Apr. 17, 1980 [JP] Japan .................. 55-50907
Apr. 18, 1980 [JP] Japan .................. 55-51398

[51] Int. Cl.³ ........................................ G01D 18/00
[52] U.S. Cl. ................................. 346/75; 346/1.1
[58] Field of Search ....................... 346/1.1, 75, 140

[56] References Cited

U.S. PATENT DOCUMENTS 3,465,350 9/1969 Keur et al. ................... 346/75
3,787,882 1/1974 Fillmore et al. ............. 346/75
3,828,354 8/1974 Hilton ......................... 346/1.1
3,946,399 3/1976 Zaretsky ..................... 346/1.1
3,999,188 12/1976 Yamada ....................... 346/75

Primary Examiner—Donald A. Griffin
Attorney, Agent, or Firm—David G. Alexander

[57] ABSTRACT

An ink jet printing apparatus causes deflected droplets of ink to move accurately to a predetermined position by detecting the deflection position of the ink droplets a multiplicity of times and varying the amount of deflection on the basis of the detected deflection position. The charging voltage level or the deflecting voltage level which is varied at each adjustment of the deflection amount has a variable amount of variation. As the adjustment of the deflection is repeated many times, the amount of variation of the charge voltage level or that of the deflection voltage level is decreased progressively at a predetermined rate. Ink droplets are charged from the first step over to the last not in a continuous manner according to the order of the steps but by each predetermined group of steps which skip the others. Furthermore, the charging is so carried out as to compensate for a deflection of a charge voltage on an ink droplet attributable to the charge voltages on ink droplets which have been charged and moved in advance of said ink droplet.

5 Claims, 28 Drawing Figures

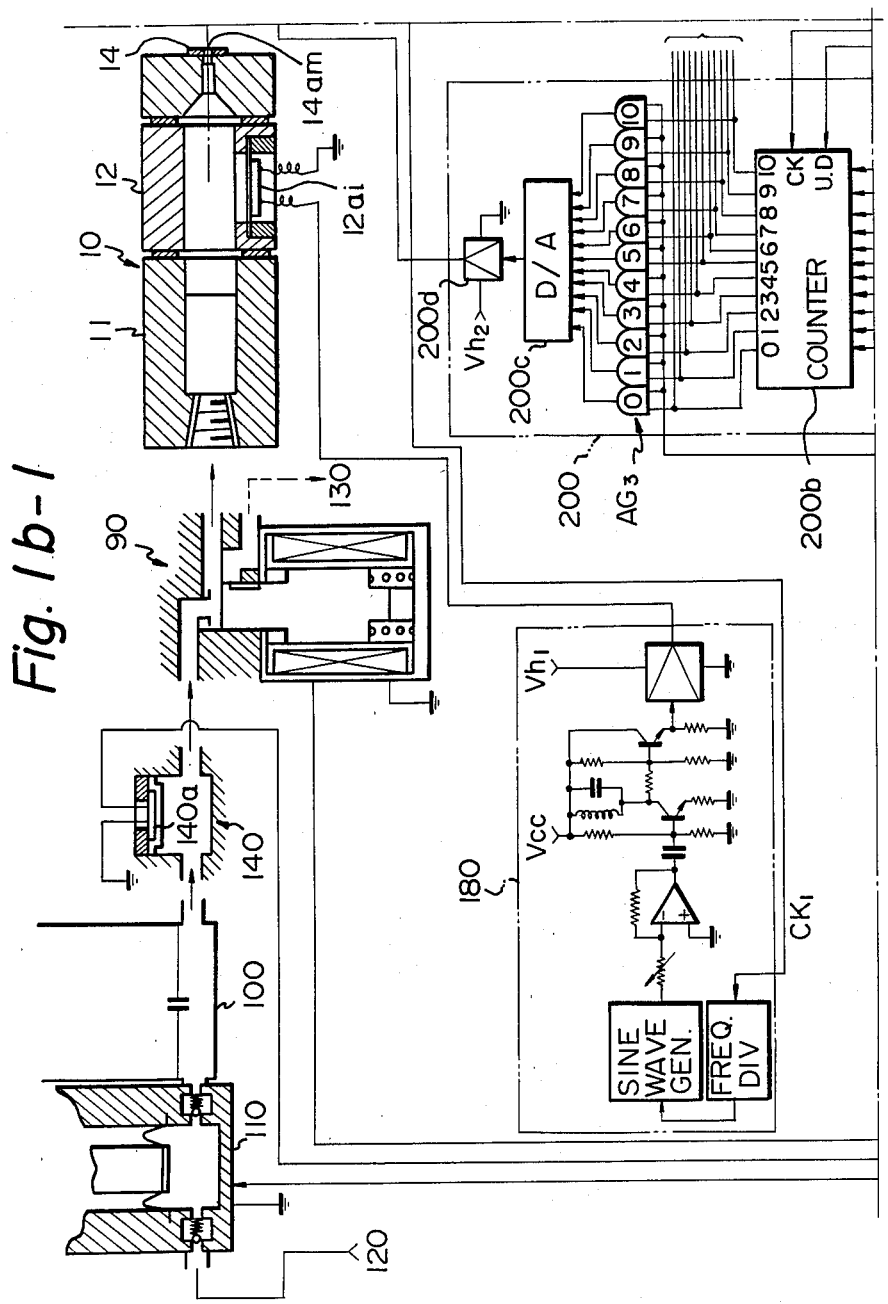

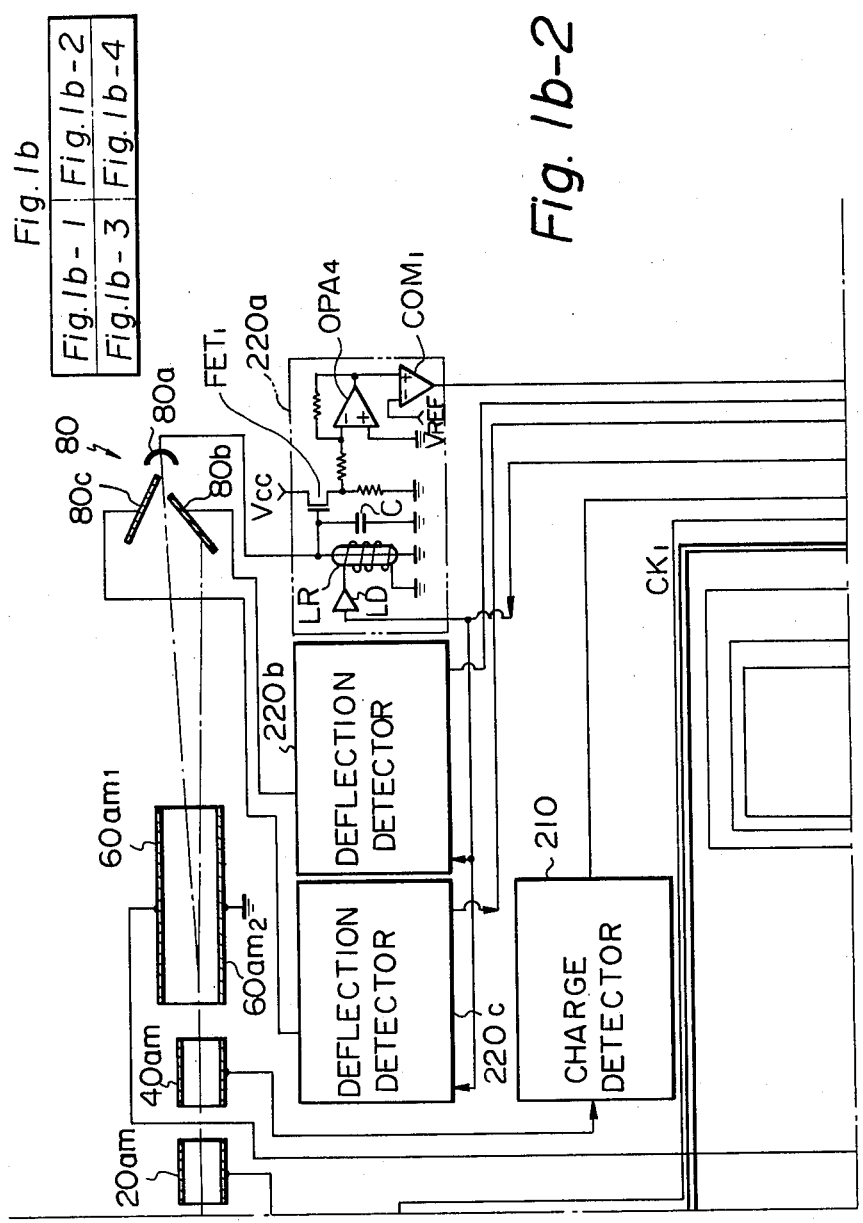

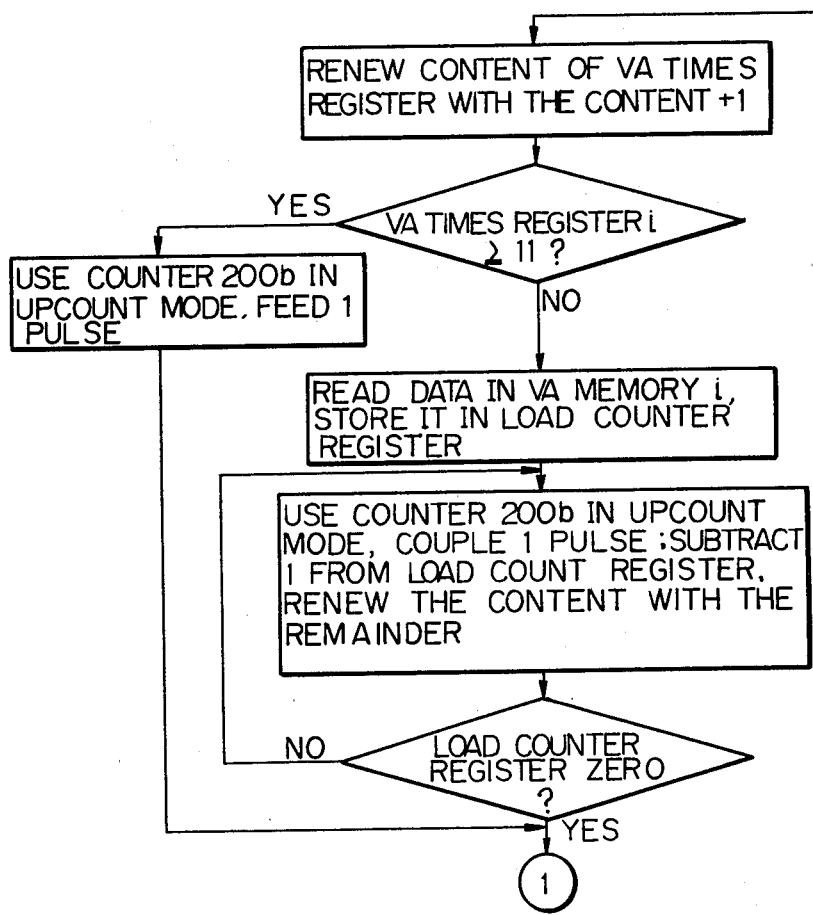

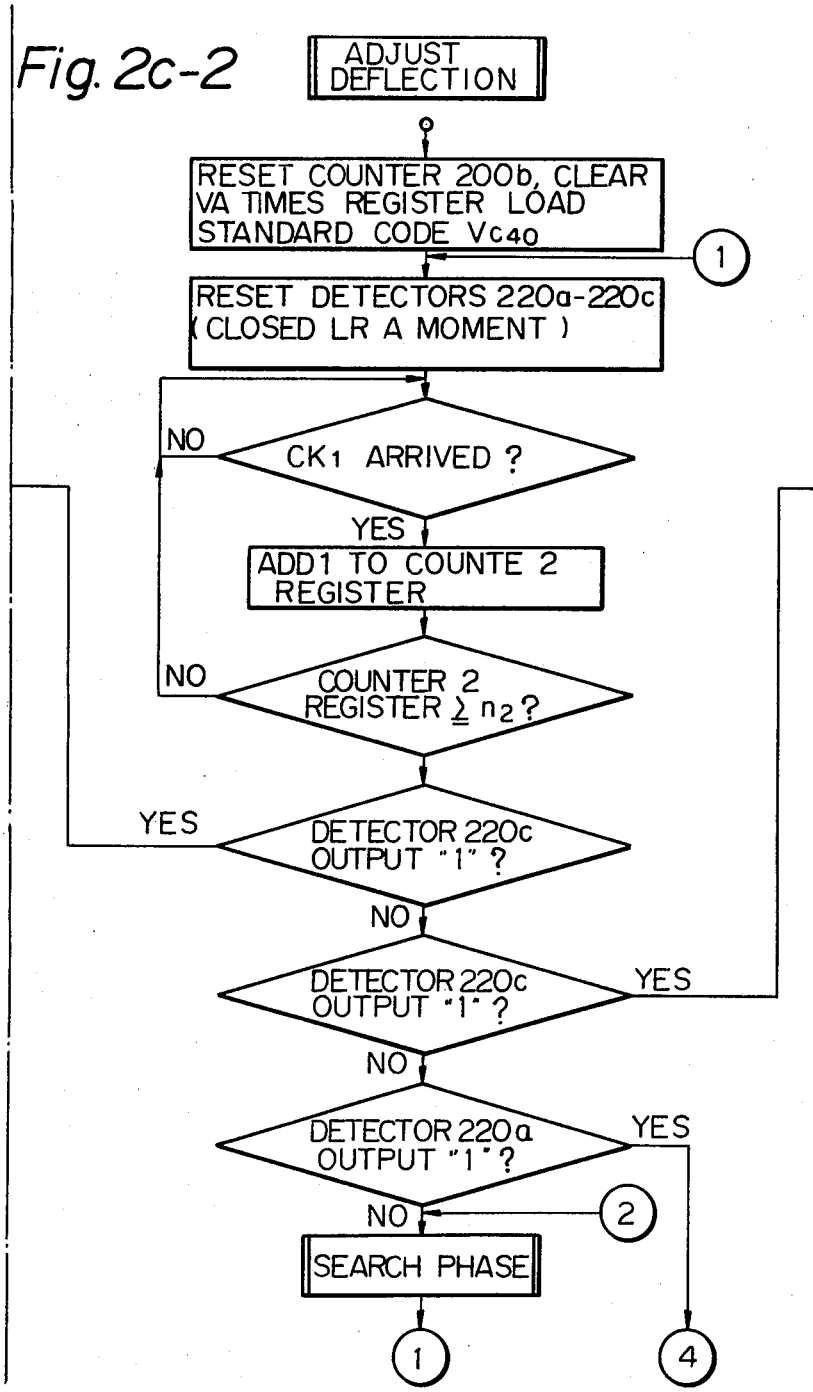

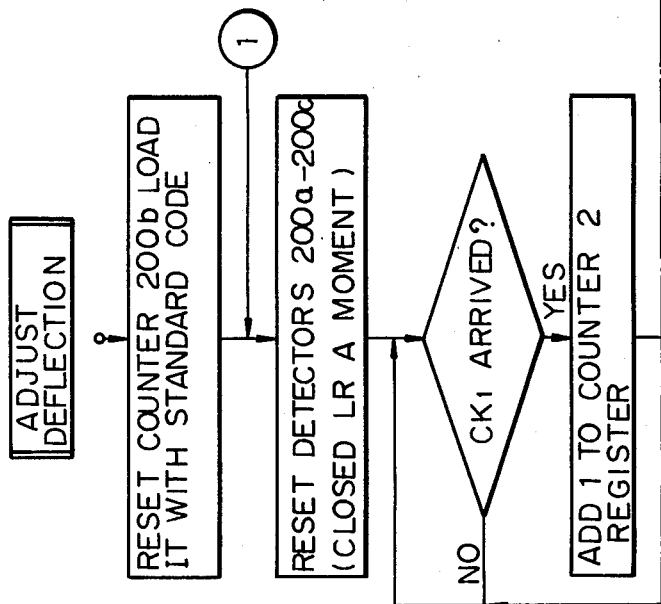

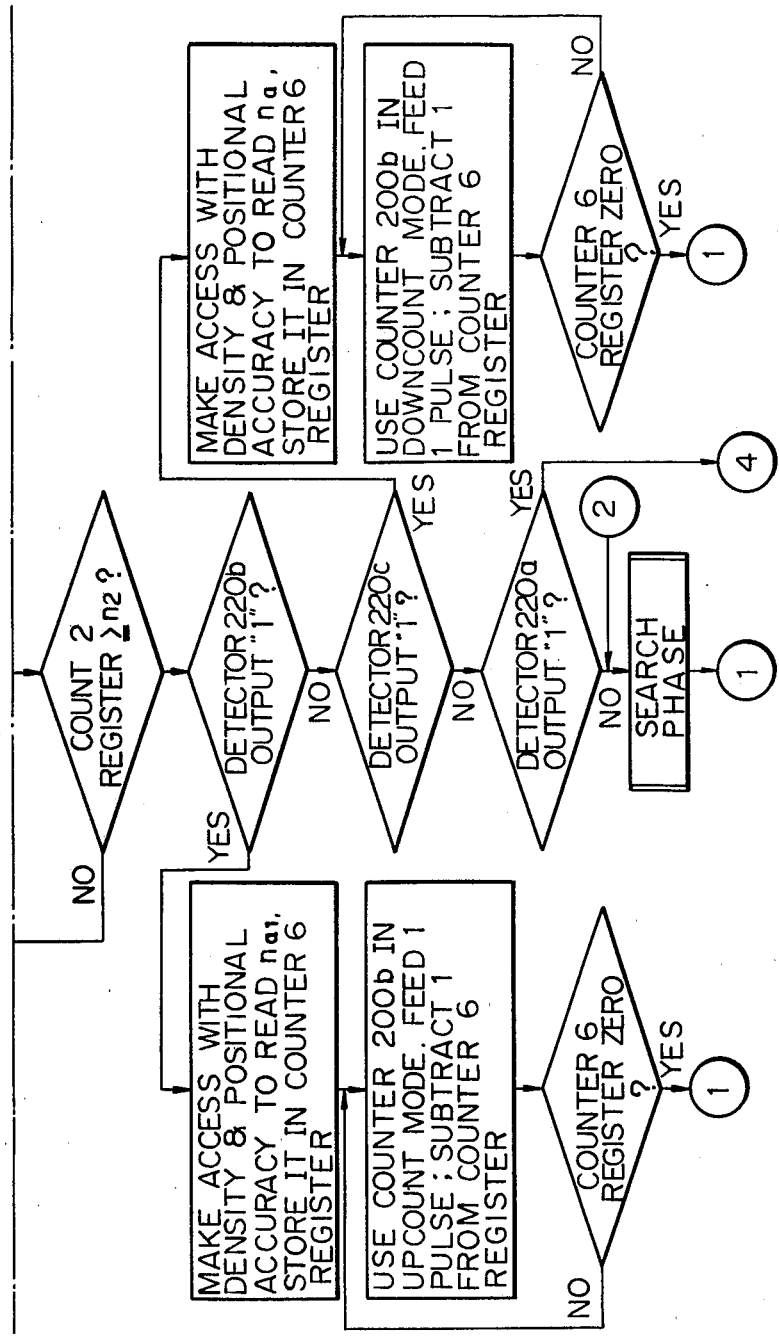

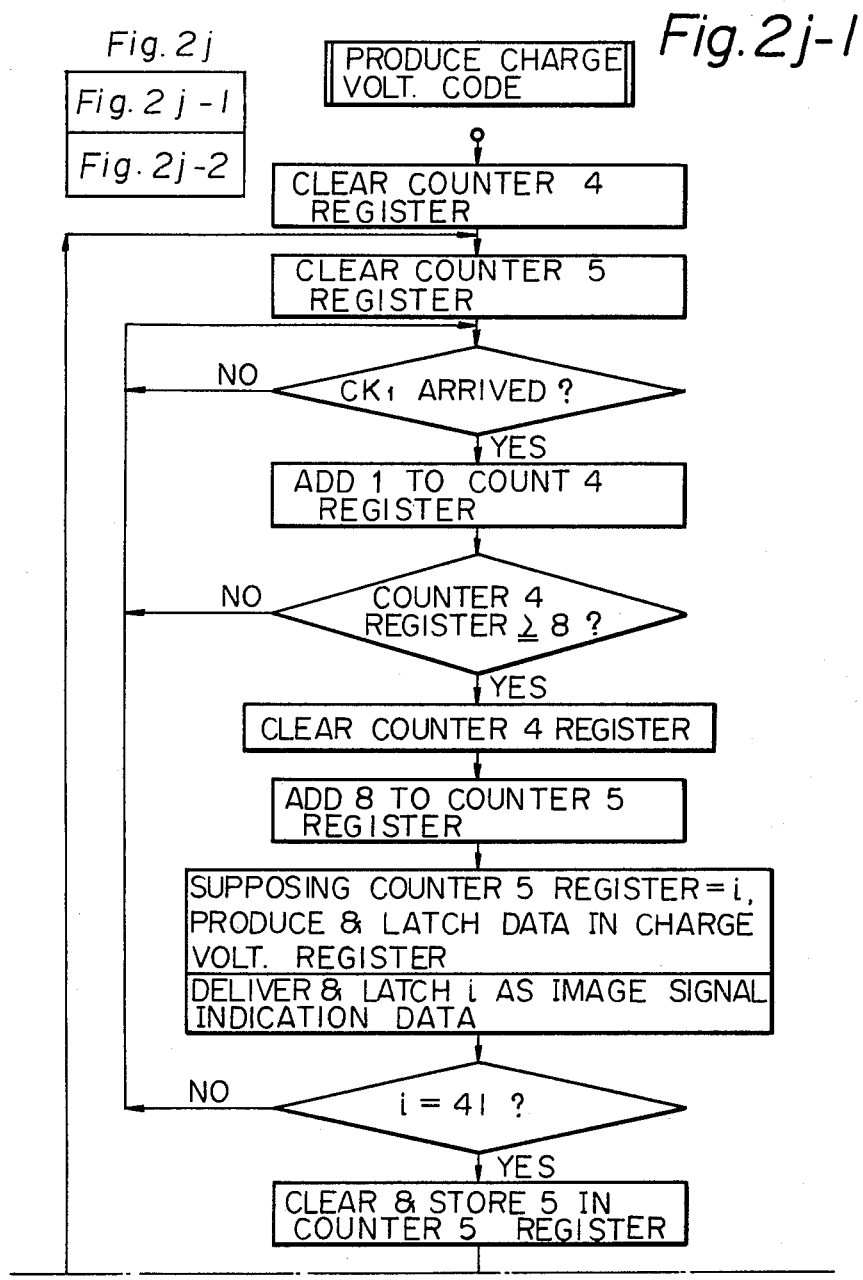

INK JET PRINTING APPARATUS

BACKGROUND OF THE INVENTION

The present invention relates to a deflection control ink jet recording apparatus which ejects ink under pressure from a nozzle, applies vibration to the ejected ink to form ink droplets regularly, develops selectively a charging electric field according to an image signal when each ink droplet shapes itself, charges the ink droplets by the electric field, and deflects the charged ink droplet by a deflecting electric field. More particularly, the present invention is concerned with a device associated with a deflection control ink jet recording apparatus of the type having a linear arrangement of numerous ink ejection holes in order to determine proper levels of charging voltage.

Known ink jet recording apparatus of the type described may be classified generally into a two-value deflection control apparatus, a multi-value deflection control apparatus and a combined apparatus of the two mentioned. In the first or two-value apparatus, ink droplets for printing data are charged (or charged to a high level) while those which are not used for printing are left non-charged (or charged to a low level or to the opposite polarity) so that the recording droplets may be deflected to a large extent by a deflecting electric field to impinge on a recording sheet and the non-recording droplets may be captured by a gutter. Conversely, the non-recording ink may be deflected to a large extent to be captured by a gutter. In this type of apparatus, one nozzle is used for one picture element during the recording operation. In the second or multi-value apparatus, one nozzle is used for three or more picture elements (e.g. 5 mm and 40 dots, assuming 8 dots/mm) and recording droplets of ink are charged to three or more levels (e.g. 40 levels) to be deflected along three or more paths (e.g. 40 paths). In the third or combined apparatus, recording ink droplets are charged in the same way as in the multi-value process. However, this last-mentioned apparatus first deflects recording charged droplets using a deflecting electric field extending in the Y-axis direction so as to cause them to miss a gutter and then deflects them using another electric field in the X-axis direction in accordance with their charging levels, thereby printing out data in the X direction on a recording sheet with positional variations.

Meanwhile, ink to be ejected from a nozzle may be vibrated by any of three known systems: one which imparts pressure oscillation to the ink proper, one which imparts vibration in an intended direction of ink ejection to a nozzle plate having at least one ink ejection hole, and one which applies vibration bodily to an ink ejection head in an intended direction of ink ejection. The first system permits the use of a single nozzle plate having one ejection hole which is bonded to the leading end of a cylindrical electrostrictive vibrator, the other end of which is communicated with a pressurized ink supply box. It also permits the use of a nozzle plate having numerous ink ejection holes which is bonded to the front wall of a pressurized ink supply box in such a manner as to cover a slit provided in said wall of the ink supply box. One or more flat electrostrictive vibrators are mounted on one side wall of the box to impart vibrating pressure to ink inside the box. The second system employs a multi-apertured nozzle plate rigidly mounted to a pressurized ink supply box through an elastic member which is caused to vibrate by an electrostrictive vibrator. The third system drives a head bodily for oscillation by means of a motor, a solenoid device, an electrostrictive vibrator or the like.

A deflection control ink jet recording apparatus of any of the systems stated places a recording sheet at a relatively large spacing from its nozzle plate. For this reason, ink is pressurized to a level high enough for a droplet of ink from the nozzle to reach the recording sheet stably along a predetermined path despite its passage through the charging and deflecting electrodes. In order that ink droplets of a given diameter may appear regularly and follow their predetermined paths accurately, there must be stabilized and exactly controlled a variety of factors including the viscosity and pressure of ink, vibrating pressure, amount of charge and intensity of deflecting electric field. It is impossible, however, to hold all of such quantities under fully ideal conditions. This particularly results in misalignment of actual deflection paths from reference deflection paths in the case of the multi-value deflection control which charges ink ejected from a single ejection hole to several different levels and drives them to different positions on a recording sheet.

Where in multi-value deflection ink droplets are charged to 40 levels, they are expected to move along 40 predetermined paths. In practice, however, the individual ink droplets tend to become offset from the predetermined paths due to the dense droplet distribution in the paths and unwanted mutual influence of the droplets caused by the very short distance between adjacent droplets and charges of the same polarity on the droplets. Another factor causative of such dislocation is that a charge on a droplet is disturbed by a charge on the immediately preceding droplet depending on the amount of charge on the latter.

It has been proposed in U.S. Pat. No. 3,787,882 to control the ink pressure by detecting at least one of the ink pressure, temperature, flying velocity and amount of deflection. However, ink pressure control without any assistance cannot afford sufficient stability, accuracy or response for the control of deflection positions of ink droplets, that is, the control of printing positions because the recording density is as high as 4 dots per mm, 8 dots per mm or the like and thus requires very delicate deflection control. For this reason, it is usually preferred to control the amounts of deflection through adjustment of voltage levels for charging ink droplets. Charging voltage levels can be adjusted delicately and quickly over such a wide range. Even if the amounts of deflection vary as a result of changes in at least one of the ink viscosity, ink pressure, power source voltage, driving characteristic and ejection conditions of ink at ink ejection ports, the adjustment of charging voltage levels will succeed in confining the amounts of deflection to predetermined values.

A prior art deflection amount control system employing adjustment of charging voltage levels is designated to determine a required charge voltage by computing a charge voltage for directing a charged ink droplet to a predetermined deflection position or its amount of variation from the correlation between a charge voltage and an offset of a droplet charged by said charge voltage from a predetermined deflection position, and set the thus determined charge voltage as an adequate charge voltage. Another known system of the type described detects an actual deflection position of a charged ink droplet and varies the charging voltage level step by step to bring the actual deflection position closer to a predetermined reference deflection position. In any of these known control systems, a charge voltage corresponding to a one step of change in the charge voltage level is fixed and the accuracy of deflection amount setting operation is dependent on the charge voltage corresponding to the one step of change. Thus, the charge voltage corresponding to one step of change has a relatively small value. It follows that a substantial offset of the actual deflection position of a charged droplet from the reference position must be corrected by repeated changes of charge voltage level which consumes a relatively long period of time.

SUMMARY OF THE INVENTION

An ink jet printing apparatus embodying the present invention comprises an ink ejection head having a plurality of nozzles each for ejecting a jet of ink, charging means for electrostatically charging the ink jet, deflection position control means adapted to repeat detection and adjustment of a deflection position a plurality of times, and control means for controlling at least one of the charging means and deflecting means to adjust a voltage level which determines an amount of deflection of the ink jet, the voltage level which determines an amount of deflection being variable.

In accordance with a first embodiment of the present invention, when ink droplets are found moving along a deflection path offset from a predetermined reference path by the first time of detection of deflection position, the charge voltage level or the deflection voltage level is varied by a first predetermined amount $V_{k1}$ in a given direction opposite to the offset direction, that is, in a higher deflection direction if the offset is to a lower deflection side or in a lower deflection direction if the offset is otherwise. When the second time of detection shows the actual deflection position still offset from the reference path, the charging voltage level or the deflection voltage level is varied this time by a second predetermined amount $V_{k2}$ which is smaller than the first amount $V_{k1}$ in a given direction opposite to the direction of offset as mentioned. Thereafter, the third time of detection of actual deflection position is carried out. Such a procedure is repeated varying the charge voltage level successively to $V_{k3}$, $V_{k4}$ ... ($V_{k1} > V_{k2} > V_{k3}$ ...) as long as the detected actual deflection position does not coincide with the reference position. The actual deflection position of ink droplets is in this way converged to the reference position by geometrical progression. The result is a noticeable decrease in the time period necessary for the deflection adjustment. In this first embodiment, the predetermined amounts are determined as $V_{k1} = 2\ V_{k2} = 4\ V_{k3} = 8\ V_{k4}$ ... meaning powers of "2", that is, $V_{k2} = \frac{1}{2}\ V_{k1}$, $V_{k3} = \frac{1}{2}\ V_{k2}$, $V_{k4} = \frac{1}{2}\ V_{k3}$ .... Then, if the amount $V_{k1}$ is predetermined, an amount of variation for the first detection of deflection position will be $V_{k1}$ and amounts for the second deflection and onward will be determined each by halving the immediately preceding amount. To omit the computation or where the complete progression is not employed, amounts of variation $V_{ki}$ may be stored in a read-only memory of like storage means in correspondence with a preselected number of times i of variation.

In accordance with a second embodiment of the present invention, the amount of charge voltage of one step is provided with a value corresponding to a required positional accuracy at least after the actual deflection position of charged ink droplets approaches predetermined one, and made as large as possible within a range which satisfies the positional accuracy. This reduces the number of steps and the time period necessary for the adjustment.

In accordance with a third embodiment of the present invention, where ink droplets are charged to the 1st level to the 40th level, the charging operation proceeds not in a continuous manner from the 1st level over to the 40th but in a skipping manner until droplets for 1 line, 40 dots are fully charged. For instance, the charging order may be the 1st level, 9th level, 17th level, ... , 5th level, 13th level, 21st level, ... , 3rd level, 11th level, 19th level, ... , 7th level, 15th level, 23rd level, 2nd level, 10th level, 18th level, and ... , 6th level, 14th level, 22nd level, ... , 4th level, 12th level, 20th level, ... , 8th level, 16th level, 24th level, 32th level and 40th level. The next line of data and onward will be printed out by charging ink droplets in the same order. Furthermore, in this embodiment, an ink droplet is charged to a voltage given by multiplying a charge voltage applied to its preceding one or more droplets by a compensatory coefficient.

It is an object of the present invention to minimize offsets of actual deflection positions of charged ink droplets from predetermined ones.

It is another object of the present invention to adjust the amounts of deflection of charged ink droplets delicately, accurately and quickly.

It is another object of the present invention to adjust the amounts of deflection of charged ink droplets in the course of recording operation.

It is another object of the present invention to promote total and quick control of deflection amounts for all ink ejection holes of a multi-nozzle ink jet printing apparatus.

It is another object of the present invention to provide a generally improved ink jet printing apparatus.

Other objects, together with the foregoing, are attained in the embodiments described in the following description and illustrated in the accompanying drawings.

BRIEF DESCRIPTION OF THE DRAWINGS

FIGS. 1b and 1c are block diagrams indicating an electric circuit arrangement associated with the mechanical arrangement shown in FIG. 1a;

FIGS. 2c, 2d, 2f, 2h and 2i are flowcharts indicating the details of adjustment of deflection amount;

FIG. 4b is a block diagram showing a modification to the print charge signal generator of FIG. 4a;

DESCRIPTION OF THE PREFERRED EMBODIMENTS

While the ink jet recording apparatus of the present invention is susceptible of numerous physical embodiments, depending upon the environment and requirements of use, substantial numbers of the herein shown and described embodiments have been made, tested and used, and all have performed in an eminently satisfactory manner.

An amount of deflection or a deflection to a predetermined position can be detected by either one of two known systems: one which employs a pair of static induction type charge detecting electrodes located to face each other through a determined deflection path and detects an amount of deflection based on a difference between their output signals, and the other which directly detects impingment of charged ink droplets by one, two or three electrodes. Particular reference will be made to the second-mentioned system in the description given hereinafter.

Figure 1A:
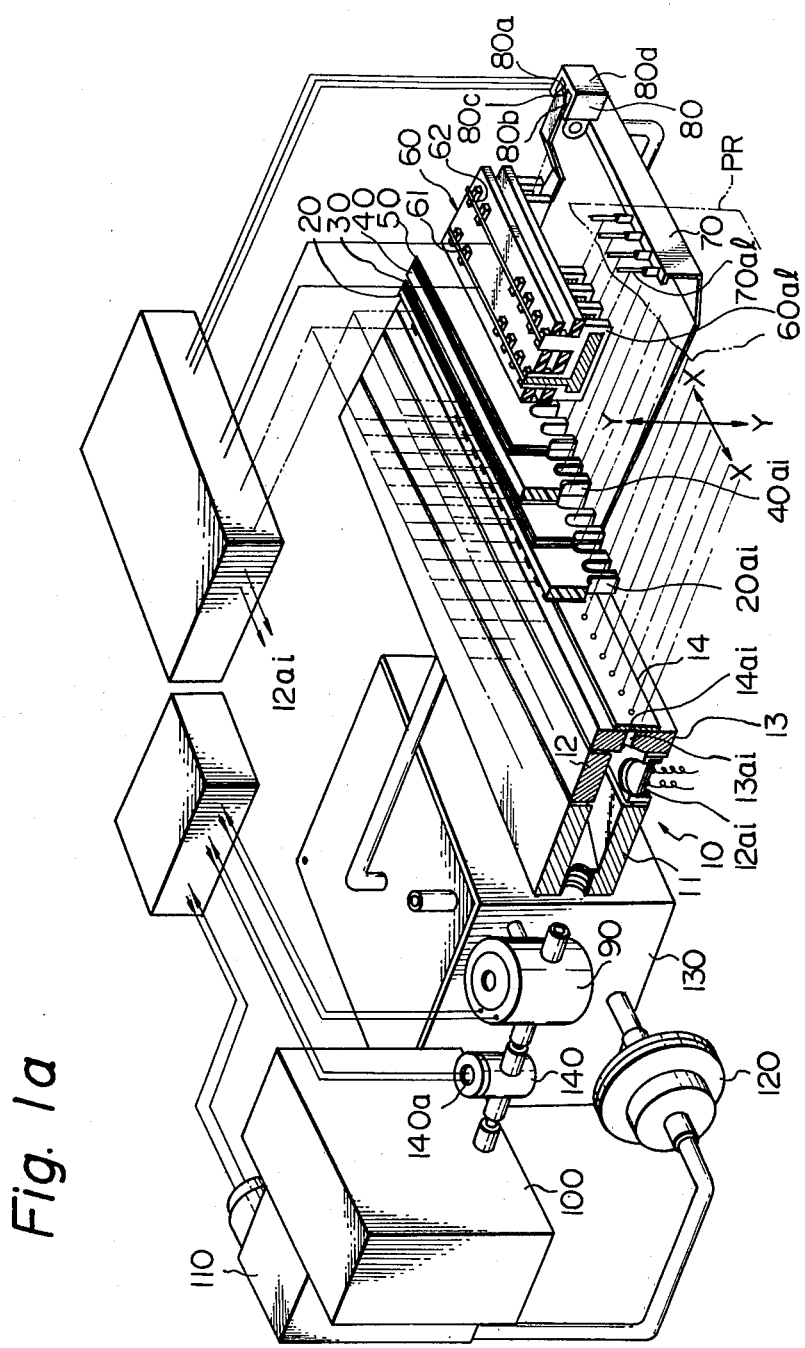
FIG. 1a shows in perspective form the mechanical arrangement of an ink jet printing apparatus embodying the present invention.
Figures 1, 1B, 2, 3:
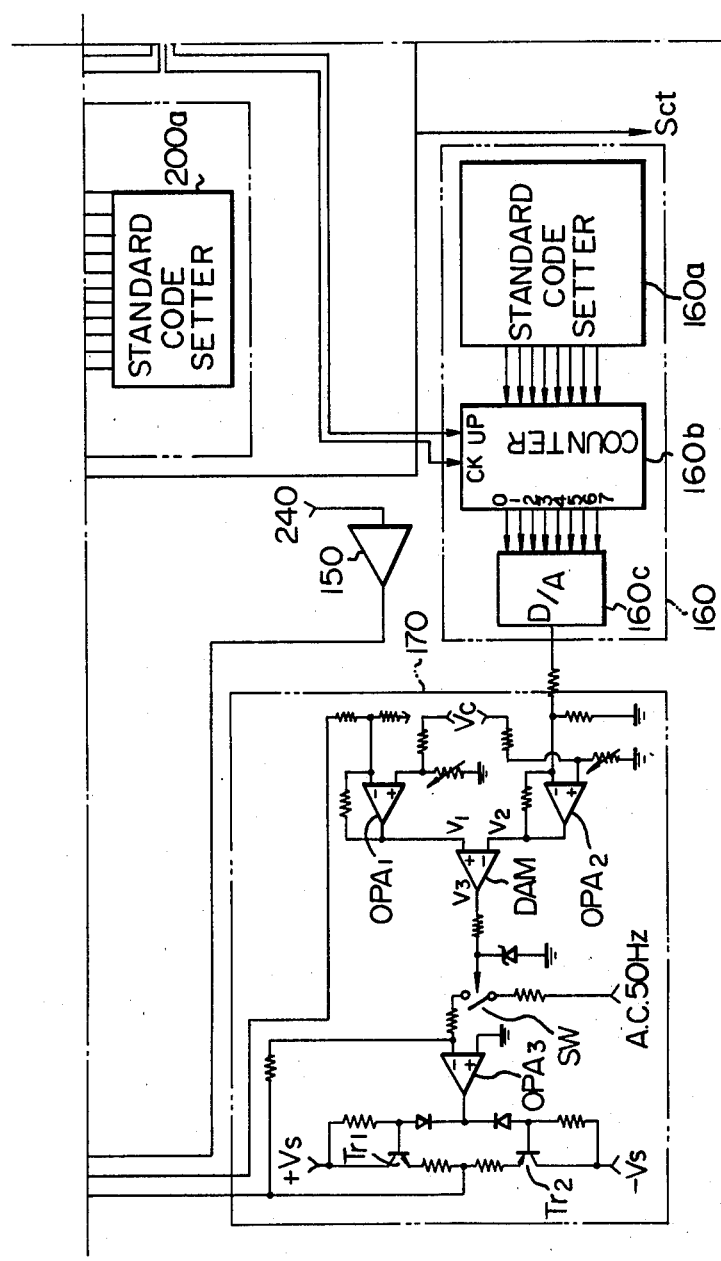
Figures 1, 1B, 2, 3, 4:
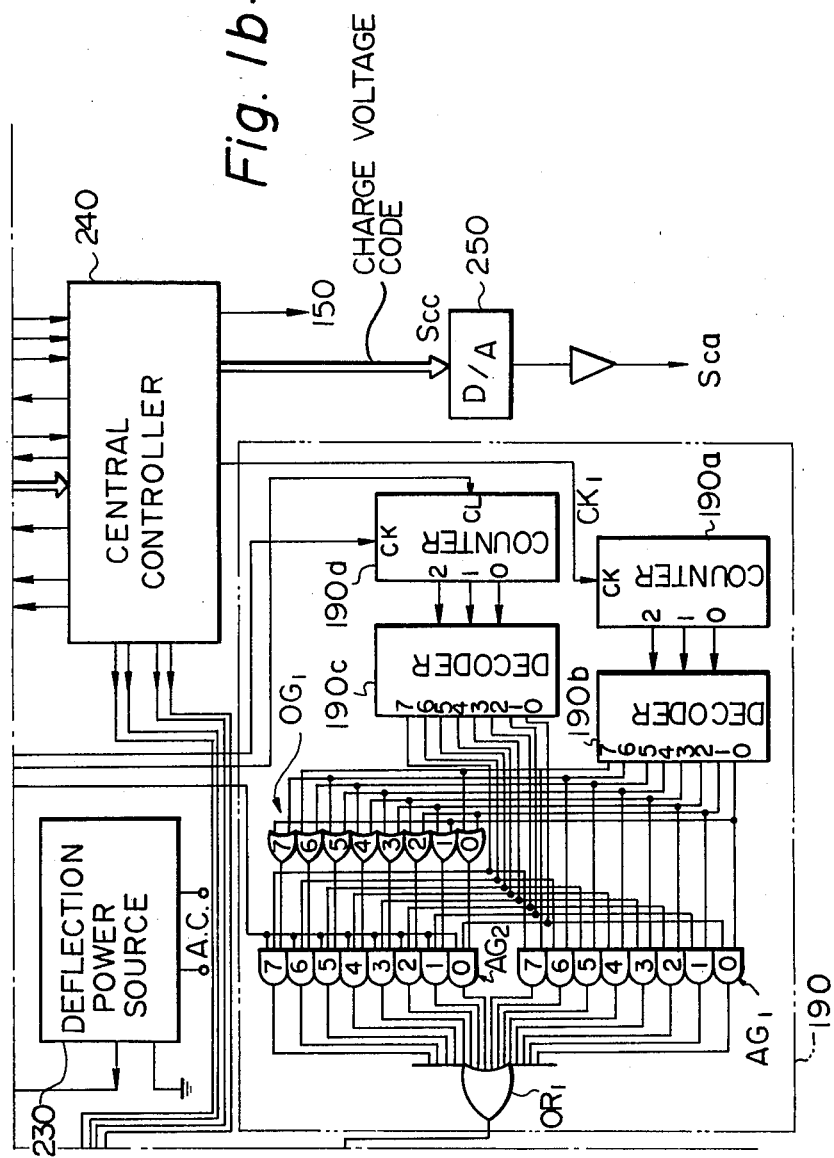
Figure 1C:
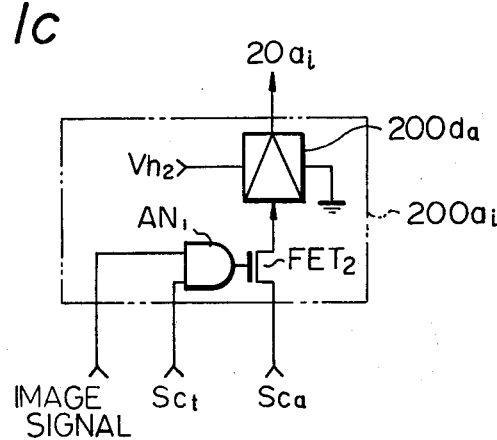

Referring to FIG. 1a of the drawing, there is shown the mechanical arrangement of a multi-nozzle type multi-value deflection ink jet recording apparatus to which the present invention is applicable. FIGS. 1b and 1c show major electric arrangements of the ink jet recording apparatus individually. The mechanical arrangement includes an ink ejection head 10 which is generally made up of a member 11 defining a common ink passage therein, a vibrator support frame 12 defining a drive space therein and a nozzle plate holder 13. The support 12 carries a plurality of electrostrictive vibrators $12a_i$ rigidly on its bottom wall. When the vibrators $12a_i$ are driven synchronously with a constant frequency, pressurized ink within the space of the support 12 will be applied with pressure oscillation of a determined frequency. The nozzle plate holder 13 is formed with a plurality of ink passageways $13a_i$ at common intervals (e.g. 5 mm) throughout its recording width, the passageways $13a_i$ communicating with the internal space of the support 12. A nozzle plate 14 is bonded to a surface of the holder 13 and provided with microscopic holes $14a_i$ at locations spaced the same distance as the ink passageways $13a_i$. The nozzle plate 14 has forty-two such holes $14a_i$ for ink ejection arranged at a common interval of 5 mm, so that one ejection head can record through the width of 42×5 mm=210 mm. Besides these holes $14a_i$, the nozzle plate 14 has an additional hole at a position outside the recording area to eject droplets of ink therefrom in the same way as from the other holes.

A charging electrode plate 20 is located in front of the nozzle plate 14 with respect to the intended direction of ink ejection from the latter. In front of the electrode plate 20, there is positioned a charge detecting electrode plate 40 via the intermediary of a shield plate 30. A deflecting electrode unit 60 is positioned in front of the electrode plate 40 via a second shield plate 50. A gutter 70 is positioned in front of the electrode unit 60. The electrode plates 20 and 40 and shield plates 30 and 50 have aligned inverted U-shaped recesses which are common in number to the holes $14a_i$ of the nozzle plate 14. The electrode plates 20 and 40 individually have printed electrodes $20a_i$ and $40a_i$ on the inner surfaces of their inverted U-shaped recesses. Each of these electrodes $20a_i$ and $40a_i$ extends out individually along the surface of the electrode $20a_i$ or $40a_i$. The deflecting electrode unit 60 has a plurality of deflecting electrode plates $60a_l$ each of which is deposited with deflecting electrodes by evaporation on the front and back surfaces thereof. The deflecting electrodes on each electrode plate $60a_l$ are individually connected to first and second conductive wires 61 and 62 respectively.

The gutter 70 has upright capturing members or catches $70a_l$ at spaced locations where droplets of ink ejected from the holes $14a_i$ of the nozzle plate 14 and left non-charged (at a non-recording level) reach as indicated by dot-and-dash lines in FIG. 1a. While the catches $70a_l$ are shown in the illustrated embodiment to have one-to-one positional correspondence with the holes $14a_i$ of the nozzle plate for ejecting recording droplets, an electrode unit 80 for detecting deflection position is located within a range which ink droplets from a monitoring ejection hole $14a_m$ of the nozzle plate 14 will reach (outside the recording sheet area). The charging electrodes $20a_i$ are supplied with a staircase voltage waveform which may have forty stepwise or incremental variable levels, in accordance with image signals. Where a scan line is to be recorded or printed on a recording sheet for example, the 1st to 40th levels of voltage pulses will be coupled to the charging electrodes $20a_i$ in correspondence with the forty ink droplets ejected from the individual holes of the nozzle plate so as to charge the ink droplets to the 1st to 40th levels. These charged ink droplets will then be deflected by electric fields across the deflecting electrodes 60 from a high voltage power supply 230 and impinge on the recording sheet by way of the 1st to 40th deflecting paths and spacings between the catches $70a_l$. Thus, one ink ejection hole $14a_i$ is used to print forty dots along the array of the catches $70a_l$ (this direction will hereinafter be referred to as a horizontal scan or X—X direction). A recording sheet designated PR in the drawing is moved continuously or intermittently in a direction Y—Y which is perpendicular to the direction X—X mentioned. Since the application of charging voltages is controlled in accordance with image signals and since the recording sheet PR is fed in the manner stated, data will be recorded on the recording sheet PR in both the X—X and Y—Y directions in the form of dots.

An accumulator 100 supplies the head 10 with pressurized ink through an electromagnetic valve 90 and is in turn supplied with ink under pressure from an ink reservoir 130 through a filter 120. Ink captured by the gutter 70 is routed back to the reservoir 130. The fluid passage between the accumulator 100 and valve 90 has a member 140 which defines a fluid chamber 140 therein and carries a semiconductive strain gauge 140a sealingly therewith. The valve 90 has a first or inlet port communicated with the member 140, a second or outlet port communicated with the member 11, and a third port communicated with the interior of the ink reservoir 130.

The valve 90 is of the type having a plunger (not shown) which will recede when the coil of the valve is energized so as to provide communication between the inlet and outlet ports while blocking the third port. When the coil is deenergized, the plunger of the valve 90 will be advanced by the action of a coil spring to a position where it closes the inlet port and communicates the outlet port with the third port. The reference numeral 110 denotes a pump which comprises a single electric coil (not shown), a plunger in the form of a polarized permanent magnet, a diaphragm and a spring-biased ball valve. The electric coil will be supplied with a current alternately in opposite directions such that the plunger is driven for reciprocation to suck and discharge ink alternately. The amount of ink delivery from the pump 110 depends on the switching frequency of the current supply thereto as well as the value of the current.

The electrode unit 80 includes a pair of charge detecting electrodes 80b and 80c which define at one end an opening wide enough to catch all the ink droplets from the monitoring ejection hole whatever the amount of deflection may be and, at the other end, a slit permitting only those droplets passed through a specific path to get therethrough. The specific path is in the embodiment a reference path of ink droplets which, concerning the 40 step charging, have been charged to the highest or 40th level of charge. The electrode unit 80 also includes a third charge detecting electrode 80a on which ink droplets passed through the slit between the electrodes 80b and 80c will impinge. These three electrodes 80a, 80b and 80c are held integrally by a support 80d but electrically insulated from each other thereby.

Reference will be made to FIG. 1b for describing a fluid control section adapted to perform on-off fluid control and pressure control and a print control section for the search of charging phases and deflection amount control.

A fluid control section comprises a valve driver (amplifier) 150, a pressure setting circuit 160 and a pump drive and control circuit 170. When the central controller 240 supplies the valve driver 150 with a valve open command (for communicating input and output ports of the valve and energizing the coil) as its "1" level output, the coil of the valve 90 is supplied with a predetermined level of current to open the valve. The pressure setting circuit 160 is made up of a standard code setter 160a, an up-down counter 160b and a digital-to-analog converter 160c. The standard code setter 160a which is of the fixed or semi-fixed type is loaded with a code corresponding to the standard ink pressure.

When one count pulse arrives at the up-down counter 160b which has been supplied with an upcount command "1" or a downcount command "0", the counter 160b produces a code indicative of a number given by adding "1 (one)" to the output code of the standard code setter 160a. The counter 160b holds said code unless a count pulse arrives thereat. The output of the counter 160b is processed by the digital-to-analog converter 160c into an analog signal and passed therefrom to the pump drive and control circuit 170.

Besides this analog signal from the converter 160c indicating a set pressure, the pump drive and control circuit 170 is supplied with an analog signal from the semiconductive strain gauge 140a. This analog output of the strain gauge 140a is high or low in level when the pressure of ink is high or low respectively. In the circuit 170, the voltage at the strain gauge 140a is inverted and amplified by an operational amplifier OPA$_1$ while the analog signal from the digital-to-analog converter 160c is inverted and amplified by another operational amplifier OPA$_2$. Output of these operational amplifiers OPA$_1$ and OPA$_2$ are commonly coupled to a differential amplifier DAM. Supposing that the operational amplifier OPA$_1$ is producing an output voltage V$_1$ (inversely proportional to the ink pressure) which is $V_1 \geq 0$ and the operational amplifier OPA$_2$ an output voltage V$_2$ (inversely proportional to the set pressure) which is $V_2 \geq 0$, the differential amplifier DAM produces an output voltage V$_3$ which is $V_3 = K(V_1 - V_2)$. Therefore, the output voltage V$_3$ of the differential amplifier DAM will become lower as the actual ink pressure rises and as the designated pressure level drops while becoming higher as the actual ink pressure drops and as the designated pressure level rises. Only at a certain predetermined level of the voltage V$_3$, a switch SW in the form of a relay or a switching semiconductive element for instance is closed to supply the inverting input terminal of a third operational amplifier OPA$_3$ with a 50 Hz sinusoidal wave which constitutes a pump drive signal. Suppose here that the voltage V$_2$ appearing from the operational amplifier OPA$_2$ is constant. Then the output voltage V$_3$ of the differential amplifier DAM is proportional to the output voltage V$_1$ of the operational amplifier OPA$_1$ and therefore inversely proportional to the ink pressure. The switch SW closes when the ink pressure is lower than a predetermined level and opens when it rises beyond the predetermined level, the pump 110 being driven only when the switch SW is open. In this way, the ink pressure is controlled to a predetermined constant level. The pressure designating signal V$_2$ is applied to the differential amplifier DAM as a reference signal for the above-mentioned constant voltage control and which shifts in inversely proportional relation with the designated pressure level. Accordingly, the ink prssure will be controlled to a first constant pressure P$_0$ in response to a given designated pressure level V$_0$, to a second constant pressure $P_h (> P_0)$ in response to a designated pressure level V$_h$ higher than the level V$_0$, and to a third constant pressure $P_l (< P_0)$ in response to a designated pressure level V$_l$ lower than the level V$_0$. While the switch SW is in its closed state, transistors Tr$_1$ and Tr$_2$ are alternately turned on in synchronism with the positive and negative half-waves of the 50 Hz sinusoidal wave whereby the coil of the pump 110 is alternately and repeatedly energized in opposite directions. That is, it is only when the switch SW is closed that the pump 100 is activated. As an alternative technique for the ink pressure control, the pump 110 may have its energizing frequency, pulse duration and/or current level controlled in accordance with the output level of the differential amplifier DAM.

The reference numeral 180 designates a driving voltage generator serving to drive the electrostrictive vibrators 12a$_i$. The central control device 240 supplies the drive voltage generator 180 with clock pulses CK$_1$. The drive voltage generator 180 subjects the input clock pulses CK$_1$ to ¼ frequency division and prepares a sinusoidal wave one cycle of which corresponds to two divided pulses. The sinusoidal wave is amplified within the drive voltage generator 180 and coupled therefrom to the electrostrictive vibrators 12a$_i$. One ink droplet shapes itself out of the ink column for each cycle of the sinusoidal wave. That is, one ink droplet appears for each eight clock pulses.

A phase setting circuit 190 of the print control section includes a counter 190a which is supplied with clock pulses CK$_1$. The counter 190a is a ring counter that upcounts the clock pulses CK$_1$ to "8" and counts "9" as "0". More specifically, while clock pulses $CK_1$ are arriving in succession, the counter 190a counts them as "0","1","2",...,"8","0","1","2",...,"8","0","1","2".... Output codes of this counter 190a are coupled to a decoder 190b. Accordingly, each time a clock pulse $CK_1$ arrives at the counter 190a, the decoder 190b shifts its high level or "1" output successively at its output terminals 0-7. Consequently, the individual output terminals 0-7 of the decoder 190b produce phase search pulses which have a common phase difference corresponding to the period $T_1$ of the clock pulses $CK_1$ relative to each other and have a duration of $T_1$ which is ⅛ of a period $T_8$ of ink droplet production. These eight sets of phase search pulses are supplied to individual AND gates 0-7 of a first AND gate group $AG_1$ and also to paired OR gates 0-7 of an OR gate group $OG_1$, respectively. Outputs of the OR gates of the OR gate group $OG_1$ are fed to AND gates 0-7 of a second AND gate group $AG_2$. As will be described, during a phase search, all of the AND gates of the second group $AG_2$ are closed and a selected one of the AND gates of the first group $AG_1$ is opened whereby a specific one of the phase search pulses or outputs at 0-7 of the decoder 190b is passed through an output OR gate $OR_1$ to a monitoring charge signal generator 200 which will be described hereinafter. Which one of the AND gates of the first group $AG_1$ is to be opened depends on the output of a second decoder 190c which is supplied with counter codes of a second counter 190d. Clearing and upcounting of the second counter 190d are controlled by a central controller or central control device or unit 240. For a phase searching operation, the central control device 240 first clears the counter 190d so that the signal level at the output terminal 0 of the decoder 190c becomes high or "1". This opens the AND gate 0 of the first group $AG_1$ to deliver a phase search pulse appearing at the output terminal 0 of the decoder 190b to the monitor charge signal generator 200. For the duration of this phase search pulse, the charge signal generator 200 applies a charging voltage to a monitor charging electrode $20a_m$. Observing the output of a charge detection circuit 210 which is connected to a monitor charge detecting electrode $40a_m$, the central control device 240 supplies the counter 190d with one pulse if the output level of the charge detector 210 has not become "1" indicative of "charged" in a predetermined period of time after the clearing of the counter 190d. Then the signal level at the next output terminal 1 of the decoder 190c becomes "1" whereby the AND gate 0 of the first group $AG_1$ is closed and the AND gate 1 is opened to pass the second set of phase search pulses or output pulses at the terminal 1 of the decoder 190b to the charge signal generator 200 through the OR gate $OR_1$. It will be seen here that the pulses thus coupled to the charge signal generator 200 have a phase delay of $T_1$ relative to the preceding set of phase search pulses. Again, the central control device 240 observes the output level of the charge detector 210 and keeps on feeding pulses to the counter 190d until the output level becomes "1", causing the counter 190d to count up. When a "1" output indicative of "charged" is supplied from the charge detector 210 to the central controller 240, the latter supplies no more pulses to the counter 190b since an optimum charging phase has been determined. Then the central controller 240 supplies all of the AND gates 0-7 of the second group $AG_2$ with ON or "1" signals therefrom. Supposing that the count at the counter 190d existing at that instant is "3", the signal level at the output terminal 2 of the decoder 190c is "1" opening the AND gate 2 of the first group $AG_1$ and the AND gate 2 of the second group $AG_2$. A third set of phase search pulses are therefore supplied from the AND gate 2 of the group $OG_1$ to the OR gate $OR_1$ while an output of the OR gate 2 of the group $OG_1$ which is the combination of phase search pulses of the second and fourth sets is coupled to the OR gate $OR_1$. Stated another way, if it is the third set of phase search pulses that corresponds to the optimum charging phase, the OR gate $OR_1$ supplies the charge signal generator 200 with a print charge pulse which is the sum (logical sum) of a pulse of the third set and those of the second and fourth sets on opposite sides of the third set, or a pulse having the search setting pulse at its center and lasting a duration of $3T_1$ which is three times as long as the duration of said pulse. Making the duration of phase search pulses short and that of print charge pulses long functions to detect a charging phase accurately through phase search and ensure positive charging for printing. It will be noted in FIG. 1b that the mechanical arrangement is shown with the monitoring ink ejection hole $14a_m$ at the center and with the monitoring charging electrode $20a_m$ and onward in sectional plan view.

As already described, the monitor charge electrode $20a_m$ is supplied with a charging voltage from the charging signal generator 200 as long as an output print charge pulse ("1" level) of the phase setting circuit 190 lasts. The charge signal generator 200 comprises a standard code setter 200a loaded with a standard charging voltage code of the maximum deflection level (lowest value of the charging voltage of the maximum deflection level), an up-down counter 200b, eleven AND gates 0-10 constituting a third AND gate group $AG_3$, a digital-to-analog converter 200c and a voltage amplifier 200d. Up- and down-counting actions of the counter 200b are controlled by the central control device 240. All of the AND gates of the third group $AG_3$ remain opened while a print charge pulse appears.

It will be recalled that the electrode unit 80 comprises two combined electrodes 80b and 80c and the electrode 80a. The position of the electrodes 80b and 80c is such that the slit gap therebetween aligns with a path which ink droplets charged by the monitoring electrode $20a_m$ supplied with a reference charging voltage are to follow. Ink droplets got through the slit gap will impinge on the electrode 80a which is so located. Deflection detectors 220a-220c are connected with the electrodes 80a, 80b and 80c, respectively.

The deflection detector 220a is made up of an integrating MOS FET (metal oxide silicone field effect transistor) $FET_1$, a capacitor C, an operational amplifier $OPA_4$, a comparator $COM_1$, a reed relay LR and a relay driver (amplifier) LD. When the relay driver LD of the deflection detector 220a is energized for a moment, the relay LR is temporarily closed causing the capacitor C to discharge or release its charge (resetting). Thereafter, when charged ink droplets come to impinge on the electrode 80a, the capacitor C is charged little by little upon impingement of each ink droplet and this charge voltage is converted into a voltage by the $FET_1$ and coupled to an operational amplifier $OPA_4$. The amplifier $OPA_4$ then amplifies the input voltage and applies its output to the comparator $COM_1$. A reference voltage Vref which is also coupled to the comparator $COM_1$ is in this embodiment set at a value lower than an output voltage of the operational amplifier $OPA_4$ which will appear after 256 droplets of ink carrying a standard charge impinge on the electrode 80a. Accordingly, by checking the output level of the circuit 220a upon appearance of 256 ink droplets after the temporary closing of the relay LR, the ink droplets can be determined as flying the determined deflection path if the output level is "1" indicating "charge detected". The other deflection detectors 220b and 220c are constructed in the same way as the deflection detector 220a. Ink droplets flying a path of short deflection would impinge on the electrode 80b whereas those flying a path of excessive deflection would impinge on the electrode 80c. Therefore, deflected positions of ink droplets can be determined by checking the outputs of the deflection detectors 220a–220c after closing the relays LR of the deflection detectors for a moment subsequently to the aforementioned phase searching operation and when the number of the clock pulses $CK_1$ counted up has reached $256 \times 8 = 2048$ for instance, that is, then 256 ink droplets have appeared. If the output of the detector 220a is "1", the deflection is adequate; if the output of the detector 220b is "1", the deflection is short; and if the output of the detector 220c is "1", the deflection is excessive.

The first embodiment of the present invention will now be described in detail. When the output level of the deflection detector 220b is determined "1" by the first detection of deflection position, the central controller 240 according to this embodiment conditions the counter 200b of the monitor charge signal generator 200 for an upcount mode and couples a first predetermined number of pulses thereto. If the output level of the deflection detector 220c is found "1", the central controller 240 conditions the counter 200b for a downcount mode and supplies a first predetermined number of pulses thereto. Then the relays LR of the deflection detectors 220a–220c are closed for a moment to reset the detectors. As another predetermined number of clock pulses $CK_1$ are counted up, the central controller 240 again checks the output levels of the deflection detectors 220a–220c (the second detection of deflection position). If the output level of the deflection detector 220b is "1", the counter 200b is conditioned for an upcount mode and supplied with a second predetermined number of pulses. If the output level of the deflection detector 220c is "1", the counter 200b obtains a downcount mode and receives a second predetermined number of pulses. Thereafter, the central controller 240 temporarily closes the relays LR to reset the individual deflection detectors 220a–220c, and again checks their outputs when another predetermined number of clock pulses $CK_1$ are counted up (the third detection of deflection position). In the same way, the counter 200b is repeatedly conditioned for an upcount or downcount mode until the output level of the deflection detector 220a becomes "1", thereby adjusting the charging voltage. The count code output of the counter 200b which will appear when the output of the detector 220a has become "1" indicates a charging voltage necessary to direct ink droplets to a predetermined maximum deflected position, i.e. the 40th step of charging voltage.

As will be described, the central controller 240 based on the charge voltage code determines the 1st to 40th steps of charge voltages and delivers them sequentially from the first step to the 40th step at the period of $T_0 = 8T_1$ in timed relation with the production of ink droplets. Upon delivery of the 40th charge voltage code, the central controller 240 repeats the delivery of the same series of charge voltage codes starting from the 1st step. The charge voltage codes are processed by a digital-to-analog converter 250 into analog signals and passed to individual print charge signal generators $200a_i$ connected with the individual charging electrodes $20a_i$ which are associated with the printing ink ejection holes $14a_i$ of the nozzle plate 14 within the recording width of the latter.

Figure 1D:
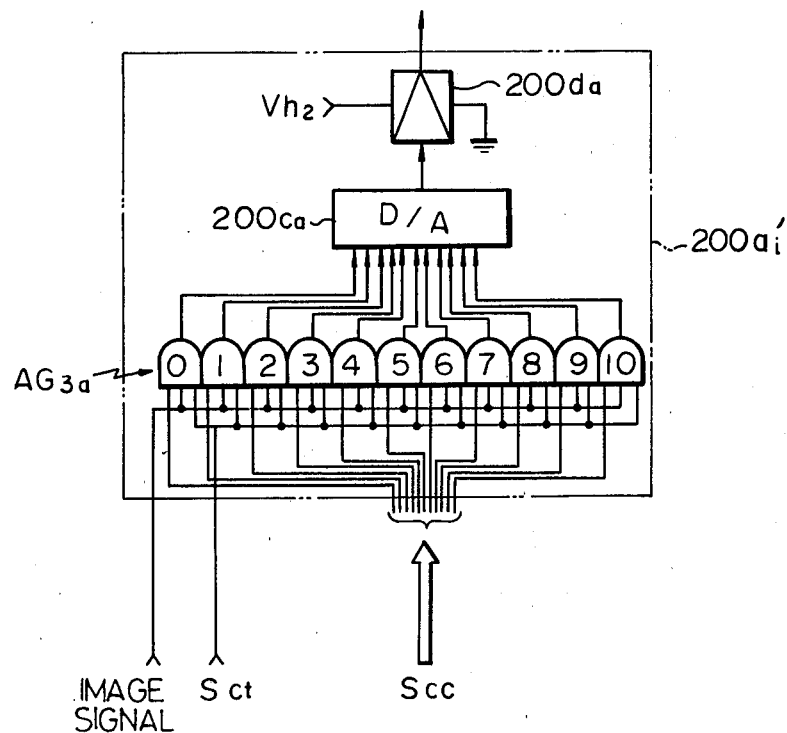
FIG. 1d is a block diagram showing a modification of a printing charge signal generator.

Each of print charge signal generators $200a_i$ has a construction depicted in FIG. 1c. The number of the generators $200a_i$ installed in the apparatus is the same as that of the charging electrodes $20a_i$ for printing. The generators $200a_i$ are commonly supplied with output analog signals from the digital-to-analog converter 250. In the charge signal generator shown in FIG. 1c, an output of the digital-to-analog converter 250 is coupled to a MOS FET designated as $FET_2$ in the drawing. This $FET_2$ receives an output of an AND gate $AN_1$ at its gate and supplies its output to a voltage amplifier $200d_a$ whose output is in turn coupled to a charging electrode $20a_i$. Applied to two input terminals of the AND gate $AN_1$ are a print charge pulse $S_{ct}$ which is an output of the phase setter 190 and an image signal (having a "1" level indicative of recording and a "0" level indicative of non-recording). Only when the image signal level is "1", a print charge pulse $S_{ct}$ is supplied to the voltage amplifier $200d_a$ which then applies a charging voltage to the electrode $20a_i$. It will be noted that, where the central controller 240 is to supply the charge voltage generators $200a_i$ for printing with charge voltage codes $S_{cc}$, each of charge voltage generators $200a_i'$ may be furnished with AND gates of a third AND gate group $AG_{3a}$ and a digital-to-analog converter $200_{ca}$ in the same way as the monitor charge voltage generator 200 as indicated in FIG. 1d of the drawings.

The central controller 240 sets an ink pressure by controlling the upcounting or downcounting operation of the counter 160b of the pressure setting circuit 160 according to an ink temperature and a command ink density signal applied thereto from the outside. When an ink pressure set by the circuit 160 is replaced by another, the phase search and the adjustment of deflection discussed hereinbefore will be carried out after the ink pressure settles at the new value determined by the circuit 160.

Concerning the central control device 240, it comprises a central processing unit or CPU which may be constituted by a microprocessor, a semiconductive read-only memory or ROM, a semiconductive random access memory or RAM and a microcomputer of one or several chips having input/output ports (not shown). The read-only memory ROM stores therein program data for practicing the aforementioned various control, constant data which will be referred to for such programs, and other additional program and constant data. The central controller 240 controls printing operation in cooperation with an image signal processing control unit (not shown) on the image signal delivery side of the apparatus.

Reference will be made to the flowcharts of FIGS. 2a–2e for describing those actions of the central controller 240 which are directly concerned with the first embodiment of the present invention.

The central controller 240 stores various constant data in its read-only memory or ROM. One of such constant data is a set of 40 steps of reference or standard charge voltages $V_{c1}$–$V_{c40}$ under a reference or standard condition wherein, when ink is ejected at a pressure indicated by a reference or standard code and an ink droplet is charged by the 40th step of charge voltage also indicated by a reference or standard code, droplets of the ink impinges on the electrode 80a. Another constant data stored in the central controller is a set of amounts of variation $V_{k1}$-$V_{k10}$ of charging voltage from the 1st time of variation to the 10th time of variation. For the convenience of description, regions of the ROM storing the data $V_{c1}$-$V_{c40}$ and $V_{k1}$-$V_{k10}$ will be individually referred to as standard charge voltage memories 1-40 and variation amount memories 1-10 and shown as "SV MEMORIES 1-40" and "VA MEMORIES 1-10" in Table 1.

The numerical values 160-960 in Table 1 correspond to decimal numbers represented by output codes of the counter 200b whereas the numerical values 512-1 indicate the numbers of count pulses coupled to the counter 200b. Droplets of ink ejected from each ink ejection hole print out data at a rate of 8 dots per mm and cover a 5 mm of printing width which therefore include 40 dots in total. The 40th deflection position is located at a distance of 6 mm from the straightforward position. A catch $70a_i$ corresponding to the ink ejection hole captures ink droplets at the straightforward position and within the range of 1 mm from the straightforward position. 20 steps of charge voltage difference are employed for the diameter of each dot ($\frac{1}{8}$ mm). These are the reasons why the charge voltage standard code $V_{c40}$ is 960 (=6×8×20). It should be noted that $V_{c40}$ is a voltage which is the product of "960" and a constant. At the 39th position, the standard charge voltage is 940 (=960−20). In the same way, the standard charge voltages $V_c$ for the other positions are progressively reduced by each "20". The amount of the 1st charge voltage variation may be 480 which is one half of 960 and the others from the second and onward may be reduced progressively each by one half of the immediately preceding amount; meaning that the amount may be 480 for the 1st charge voltage variation, 240 for the 2nd charge coltage variation, 120 for the 3rd charge voltage variation, 60 for the 4th charge voltage variation, 30 for the 5th charge voltage variation, 15 for the 6th charge voltage variation, 8 for the 7th charge voltage variation, 4 for the 8th charge voltage variation, 2 for the 9th charge voltage variation, and 1 for the 10th charge voltage variation. In the example shown in Table 2, all of such amounts are n-th powers of "2" which make the discrimination of codes simple.

A random access memory or RAM of the central controller has regions for temporary storage of data which will be called registers hereinafter for the convenience of description. The registers referred to in the flowcharts shown in the Figures are for temporary storage of contents indicated in Table 2.

TABLE 1
STORED DATA IN ROM

| STORED REGION | STORED CONTENT | VALUE (decimal) |
|---|---|---|
| SV MEMORY 1 | standard charge voltage $V_{c1}$ for deflection to 1st position | 160 |
| SV MEMORY 2 | standard charge voltage $V_{c2}$ for deflection to 2nd position | 180 |
| SV MEMORY 3 | standard charge voltage $V_{c3}$ for deflection to 3rd position | 200 |
| ⋮ | ⋮ | ⋮ |
| SV MEMORY 40 | standard charge voltage $V_{c40}$ (set code of 200a) for deflection to 40th position | 960 |
| VA MEMORY 1 | amount of 1st charge voltage variation | 512 |
| VA MEMORY 2 | amount of 2nd charge voltage variation | 256 |
| VA MEMORY 3 | amount of 3rd charge voltage variation | 128 |
| VA MEMORY 4 | amount of 4th charge voltage variation | 64 |
| VA MEMORY 5 | amount of 5th charge voltage variation | 32 |
| VA MEMORY 6 | amount of 6th charge voltage variation | 16 |
| VA MEMORY 7 | amount of 7th charge voltage variation | 8 |
| VA MEMORY 8 | amount of 8th charge voltage variation | 4 |
| VA MEMORY 9 | amount of 9th charge voltage variation | 2 |
| VA MEMORY 10 | amount of 10th charge voltage variation | 1 |

TABLE 2
READ/WRITE MEMORY DATA IN RAM

| MEMORY REGION | CONTENT |
|---|---|
| TIMER 1 REGISTER | count of $CK_1$ for counting time |
| TIMER 2 REGISTER | " |
| COUNTER 1 REGISTER | " |
| COUNTER 2 REGISTER | number of formed ink droplets (for deflection detection) |
| CHARGE VOLT REGISTER 1 | charge voltage $V_{a1}$ actually applied to $20a_i$ for 1st deflection position |
| CHARGE VOLT REGISTER 2 | charge voltage $V_{a2}$ actually applied to $20a_i$ for 2nd deflection position |
| CHARGE VOLT REGISTER 3 | $S_{cc}$ charge voltage $V_{a3}$ actually applied to $20a_i$ for 3rd deflection position |
| ⋮ | ⋮ |
| CHARGE VOLT REGISTER 40 | charge voltage $V_{a40}$ actually applied to $20a_i$ for 40th deflection position |
| COEFFICIENT REGISTER | voltage $V_{m40}/V_{c40}$ indicated by count code of counter 200b |
| COUNTER 4 REGISTER | number of $CK_1$ (for frequency division) |
| COUNTER 5 REGISTER | number of formed ink droplets (for switching charge voltage) |
| VA TIMES REGISTER | number of times of charge voltage variation |
| LOAD COUNT REGISTER | number of pulses coupled to counter 200b |

Figure 2A:
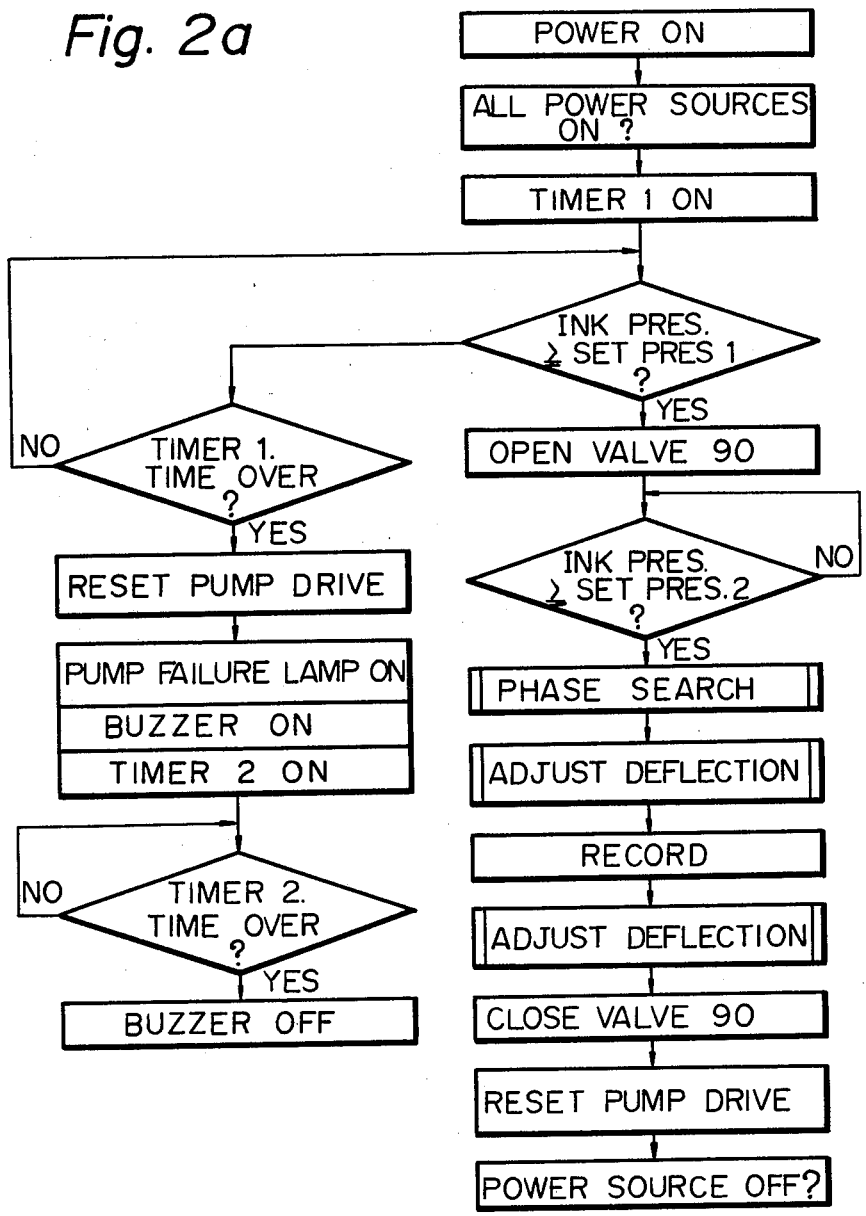
FIG. 2a is a flowchart outlining a control operation of a central control device from a step of power source application to the end of recording.

Referring now to FIG. 2a, the operation of the central control unit 240 in the first embodiment of the invention will be outlined. When supplied with power itself, the central controller 240 turns on power sources of various instruments and circuits which it is to control (FIGS. 1b and 1c) in a predetermined sequence. The central controller 240 resets the counter 160b of the pressure setting circuit 160 and loads it with a standard code. This causes the pump driver 170 to activate the pump for establishing a standard ink pressure. After thus setting a target ink pressure at the standard level, the central controller 240 starts counting up the clock pulses $CK_1$. This is performed according to a count program which causes the controller to add "1" to the content of the timer 1 register every time a clock pulse $CK_1$ arrives and store the sum anew in the timer 1 register. During this action, the central controller 240 keeps on checking the output pressure of the semiconductive strain gauge 140a. When this pressure grows beyond the reference level 1, the central controller 240 activates the valve 90 to thereby provide communication between the accumulator 100 and ink jet head 10. If the ink pressure remains lower than the reference level 1, after the timer 1 register has reached the reference value or under a "time over" condition, the central controller 240 turns off the power sources for pump drive and control circuits and for printing actions while latching a failure indication lamp and a buzzer in their energized states. At the same time, the central controller 240 starts adding "1" to the timer 2 register in synchronism with the clock pulses $CK_1$ and storing the sums anew in succession (timer 2 ON). As the timer 2 register exceeds a predetermined count meaning "time over", the buzzer is deenergized but the lamp is kept turned on. As already stated, when the ink pressure rises beyond the reference value 1 and the valve 90 is opened, ink will be ejected from the head 10 resulting in a temporary drop of the ink pressure. To cope with this, the central controller 240 waits until the ink pressure exceeds a second reference level 2 and then performs phase search which is followed by adjustment of the amount of deflection. After the adjustment of the deflection amount, the central controller 240 informs the image signal delivery side of the end of preparation for recording operation and demands the supply of image signals. The central controller 240 in this way performs its actions for reproducing images on the recording sheet. During printing operation, the central controller 240 carries out phase search and adjustment of deflection amount in response to phase search commands and deflection adjustment commands which will be applied thereto from the image signal delivery side. Upon completion of the printing operation, the central controller 240 in response to an end command from the image signal delivery side first deenergizes the valve 90 and then turns off the power source associated with the pump drive and control circuit and then turns off the power sources for the other units and circuits (FIGS. 1a, 1b and 1c). The power source associated with the controller 240 proper is turned on and off by the image signal delivery side.

Referring to FIGS. 2b–2f, there will be described in detail those operations of the central controller 240 for searching a phase, adjusting the amount of deflection and setting a charge voltage during printing action.

Figure 2B:
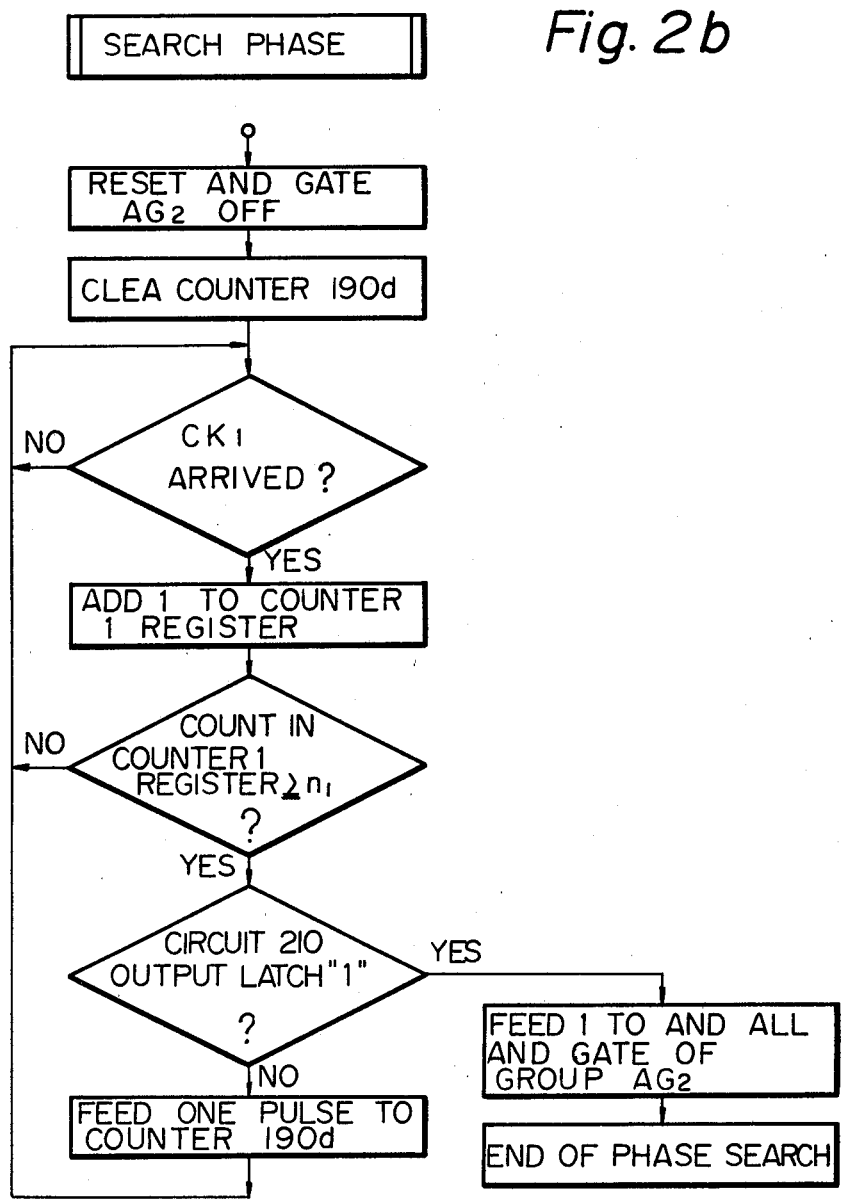
FIGS. 2b and 2g are flowcharts demonstrating in detail the steps of phase searching and setting.

Concerning the phase searching procedure, the central controller 240 first closes all of the AND gates 0–7 of the second group $AG_2$ in the phase setter 190 (output latch reset of the controller 240) and clears the counter 190d as shown in FIG. 2b. In this situation only the AND gate 0 of the first group $AG_1$ remains opened so that only the first set of phase search pulses (appearing at the output terminal 0 of the decoder 190b) are coupled to the monitor charge signal generator 200. The controller 240, counting the clock pulses $CK_1$ (the counter 1 register storing the number of received clock pulses $CK_1$), checks whether the charge detector 210 has latched a "1" output when the count of the clock pulses increases beyond a predetermined number $n_1$, that is, after the formation of a predetermined number of ink droplets. If not "1", the controller 240 supplies one pulse to the counter 190d. At this instant, the decoder 190c switches the "1" level output from the output terminal 0 to the output terminal 1 whereby the AND gate 1 of the first group $AG_1$ is allowed to pass the second set of phase search pulses (output terminal 1 of the decoder 190b) therethrough to the monitor charge signal generator 200. Upon lapse of a predetermined period of time, the controller 240 refers to the output level of the charge detector 210 and, if it is "0", again supplies one pulse to the counter 190d. In this way, the phase search pulses applied to the monitor charge signal generator 200 are shifted by TI each within the droplet forming period $T_8 = 8T_1$ where $T_1$ is the period of the clock pulses $CK_1$. An output code of the counter 190d which appears when the output of the charge detector 210 becomes "1" meaning the "charged" state of the ink droplets indicates the phase search pulses which properly charge the ink droplets. After this phase search, the controller 240 opens all of the AND gates 0–7 of the second group $AG_2$ and latches them in this state. Then the OR gate $OR_1$ is allowed to produce print charge pulses each having a proper phase search pulse at the center and lasting a duration of $3T_1$ which is three times as long as that $T_1$ of the proper phase search pulse.

Figures 2, 2C, 3:
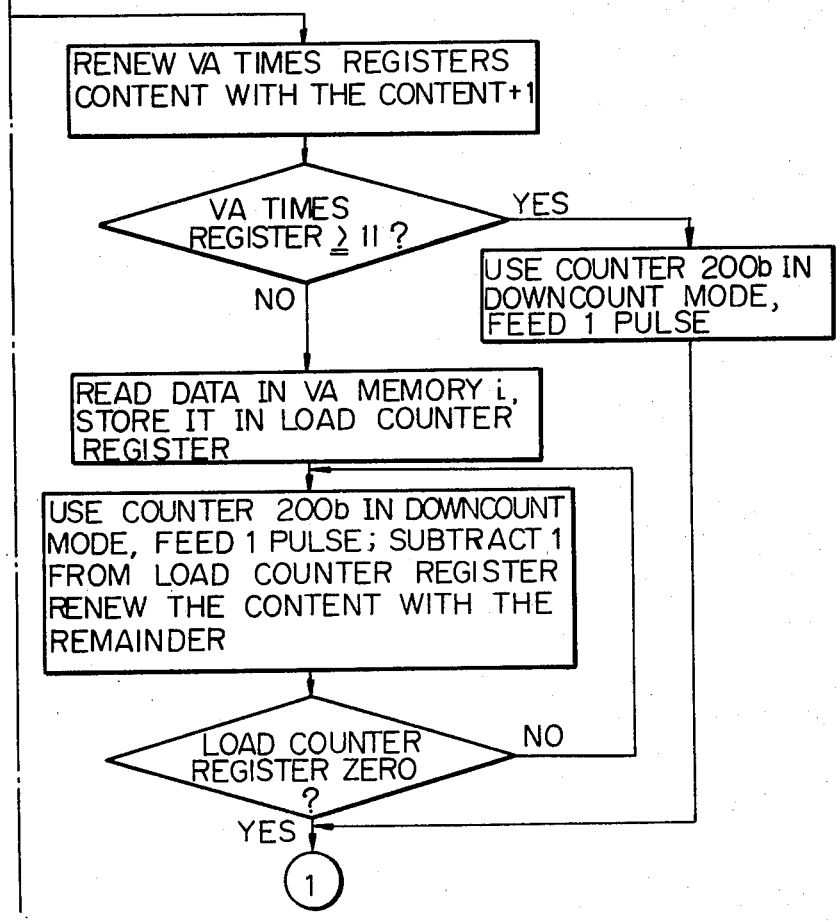

The operation for adjusting the amount of deflection in the first embodiment will be described with reference to the flowcharts of FIGS. 2c and 2d. In this operation, the central controller 240 first resets the counter 200b, clears the number of variation times or VA times register shown in Table 2, loads the counter 200b with a standard code $V_{c40}$, and applies a standard charge voltage of the 40th step to the charging electrode $20a_m$. The reed relays LR of the deflection detectors 220a–220c are then closed for a moment to discharge or release the charge in the capacitor C whereupon counting ink droplets formed is started. As this count reaches a predetermined number, the central controller 240 checks the output levels of the deflection detectors 220a–220c. If the output of the deflection detector 220a is "1", the amount of deflection is determined proper and the counter 200b is kept loaded with the standard code $V_{c40}$. If the output of the deflection detector 220b is "1", the central controller 240 adds "1" to the content of the VA times register, stores the sum anew in the VA times register, reads data stored in a variation amount or VA memory i (Table 1) corresponding to the renewed data i, stores said data in the load count register, conditions the counter 200b for an upcount mode and couples count pulses thereto, subtracts "1" from the content of the load count register every time one pulse is applied to the counter 200b, stores each remaining value anew in the load counter register, and determines whether the content of the load count register has reached zero. Until it reaches zero, the central controller 240 repeats the upcounting at the counter 200b and subtraction (downcounting) at the load count register. Upon decrease to zero, the central controller 240 closes the reed relays LR for a moment and again starts counting clock pulses $CK_1$. After a predetermined count of the clock pulses $CK_1$, the central controller 240 re-checks the output levels of the deflection detectors 220a–220c. If the output of the deflection detector 220c is "1", the counter 200b is caused to downcount; the other part of the procedure is the same as the case wherein the output of the deflection detector 220b has been "1". When the output of the deflection detector 220b is found "1" at the 1st detection of deflection position, the counter 200b is caused to further count up "512" from the standard code $V_{c40}$ (960); when the output of the deflection detector 220c is found "1", the counter 200b is caused to count down "512" from the standard code $V_{c40}$ (960). If the deflection detector 220b is found producing a "1" output at the 2nd detection of deflection position, the counter 200b is caused to count up farther "256" from the existing count; if the output of the deflection counter 220c is "1", the counter 200b is caused to count down "256" from the existing count. The procedure discussed hereinabove for the detection of deflection position and the variation of the charge voltage may be summarized as: closing the reed relays LR of the deflection detectors 220a–220c for a moment, counting ink droplets formed from that instant, checking the output levels of the deflection detectors 220a–220c when the count reaches predetermined one, adding "1" to the content of the variation register and storing in the load count register data which is stored in a variation or VA storage i corresponding to the sum i if the output level of the deflection detector 220b or 220c is "1", and conditioning the counter 200b for an upcount mode if the output of the deflection detector 220b is "1" or for a downcount mode if the output level of the deflection detector 220c is "1" while supplying the thus conditioned counter 200b with a number of pulses indicated by the data stored in the load count register.

Normally, the output of the deflection detector 220a becomes "1" before the content of the number of times of variation or VA times register reaches "10", completing the adjustment of deflection. If the content of the VA number register increases to "11" or above before the output of the deflection detector 220a becomes "1", the counter 200b will count up or count down one pulse for each time of adjustment of deflection position. Stated another way, the amount of charge voltage variation is varied progressively from the rough to the fine up to the 9th variation but, when a proper deflection fails to be attained even at the minimum variation unit, the charge voltage is varied little by little by each minimum variation unit.

Figure 2D:
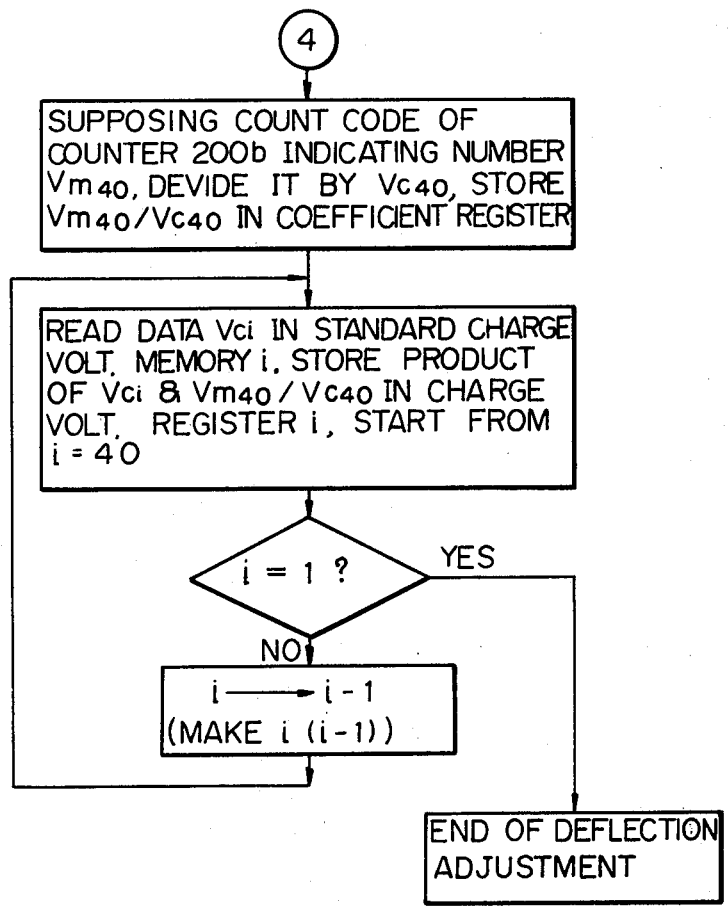

As the output of the deflection detector 220a becomes "1", a compensatory coefficient $V_{m40}/V_{c40}$ is prepared as shown in FIG. 2d by dividing the charge voltage $V_{m40}$ indicated by the count code at the counter 200b by the standard charge voltage $V_{c40}$ (Table 1) stored in the standard charge voltage or SV memory 40 of the ROM. The compensatory coefficient is stored in the coefficient register. The data $V_{c40}$ stored in the SV memory 40 is multiplied by the coefficient $V_{m40}/V_{c40}$ and the resulting product $V_{a40}$ is stored in the charge voltage register 40 (Table 2). Then the data $V_{c39}$ stored in the SV memory 39 of the ROM is multiplied by the coefficient $V_{m40}/V_{c40}$ and the product $V_{a39}$ is stored in the charge voltage storage 39. A similar procedure is repeated until the data $V_{c1}$ stored in the SV memory 1 of the ROM is multiplied by the coefficient $V_{m40}/V_{c40}$ and the resultant product $V_{a1}$ is stored in the charge voltage register 1. This is the end of the deflection amount adjustment.

During printing operation, the central controller 240 sequentially produces and latches the data stored in the charge voltage registers 1–40 in synchronism with the formation of each ink droplet. After producing data from the charge voltage register 40, the central controller 240 goes back to the charge voltage register 1 and again circulates through the other registers in the same manner.

As will be apparent from the above description, the first embodiment of the present invention promotes quick yet accurate adjustment since it adjusts and sets the charging voltage and/or the deflecting voltage by detecting a deflection position of ink droplets and since, in deflection adjustment, it varies the amount of deflection in a convergence mode from the rough to the fine.

The second embodiment of the present invention will be described in detail hereinafter. When the output level of the deflection detector 220b is "1", the central controller 240 causes the counter 200b into an upcount mode and supplies it with pulses $n_a$ corresponding in number to a designated positional accuracy. If the output of the deflection detector 220c is "1", the counter 200b is conditioned for a downcount mode and supplied with pulses $n_a$ in the same way. Then the central controller 240 closes the relays LR of the deflection detectors 220a–220c to reset these circuits, and counts input clock pulses $CK_1$. Upon increase in the $CK_1$ count to a predetermined value, the central controller 240 again checks the outputs of the deflection detectors 220a–220c. Thereafter, the central controller 240 repeatedly causes the counter 200b to upcount or downcount pulses $n_a$ until a "1" output appears from the deflection detector 220a and thereby adjusts the charge voltage. The read-only memory ROM in the central controller 240 stores therein, as one of constant data, 40 steps of standard charge voltage from the 1st to 40th under a standard condition wherein ink droplets impinge on the electrode 80a when they are formed from an ink column ejected at a pressure indicated by a standard code and are charged by the 40th step of charge voltage indicated by a standard code as in the first embodiment. Additionally, the ROM according to this embodiment stores command ink pressure data corresponding to densities (dot diameters) and the numbers to be up- or downcounted each time ($n_a$) corresponding to printing positional accuracies and densities, that is, basic data for 1-step charge voltage variations (see Table 3).

It will be noted that SV MEMORIES in Table 3 stand for standard charge voltage memories as in Table 1, DD STORAGES stand for density data memories, and STEP VA storages stand for amount of step variation storages.

The central controller has in its random access memory or RAM storage regions for memorizing data temporarily. As in the first embodiment, these specific regions of the RAM will be called registers for the convenience of description. The registers in this embodiment referred to in the flowcharts are concerned with the data indicated in Table 4.

TABLE 3

| STORED REGION | STORED DATA IN ROM<br>STORED CONTENT |
|---|---|
| SV MEMORY 1 | standard charge voltage $V_{c1}$ for deflection to 1st position |
| SV MEMORY 2 | standard charge voltage $V_{c2}$ for deflection to 2nd position |

TABLE 3-continued

STORED DATA IN ROM

| STORED REGION | STORED CONTENT |
|---|---|
| SV MEMORY 3 | standard charge voltage $V_{c3}$ for deflection to 3rd position |
| ⋮ | ⋮ |
| SV MEMORY 40 | standard charge voltage $V_{c40}$ for deflection to 40th position (set code of 200a) |
| DD STORAGE 1 | ink pressure code at density 1 |
| DD STORAGE 2 | ink pressure code at density 2 |
| ⋮ | ⋮ |
| DD STORAGE 4 | ink pressure code at density 4 |
| STEP VA MEMORY $1_1$ | 1-step count $n_{a11}$ at density 1, positional accuracy A |
| STEP VA MEMORY $1_2$ | 1-step count $n_{a12}$ at density 2, positional accuracy A |
| STEP VA MEMORY $1_3$ | 1-step count $n_{a13}$ at density 3, positional accuracy A |
| STEP VA MEMORY $1_4$ | 1-step count $n_{a14}$ at density 4, positional accuracy A |
| STEP VA MEMORY $2_1$ | 1-step count $n_{a21}$ at density 1, positional accuracy B |
| STEP VA MEMORY $2_2$ | 1-step count $n_{a22}$ at density 2, positional accuracy B |
| STEP VA MEMORY $2_3$ | 1-step count $n_{a23}$ at density 3, positional accuracy B |
| STEP VA MEMORY $2_4$ | 1-step count $n_{a24}$ at density 4, positional accuracy B |
| STEP VA MEMORY $3_1$ | 1-step count $n_{a31}$ at density 1, positional accuracy C |
| STEP VA MEMORY $3_2$ | 1-step count $n_{a32}$ at density 2, positional accuracy C |
| STEP VA MEMORY $3_3$ | 1-step count $n_{a33}$ at density 3, positional accuracy C |
| STEP VA MEMORY $3_4$ | 1-step count $n_{a34}$ at density 4, positional accuracy C |
| STEP VA MEMORY $4_1$ | 1-step count $n_{a41}$ at density 1, positional accuracy D |
| STEP VA MEMORY $4_2$ | 1-step count $n_{a42}$ at density 2, positional accuracy D |
| STEP VA MEMORY $4_3$ | 1-step count $n_{a43}$ at density 3, positional accuracy D |
| STEP VA MEMORY $4_4$ | 1-step count $n_{a44}$ at density 1, positional accuracy D |

TABLE 4

READ/WRITE MEMORY DATA IN RAM

| MEMORY REGION | CONTENT |
|---|---|
| TIMER 1 REGISTER | count of $CK_1$ for counting time |
| TIMER 2 REGISTER | " |
| COUNTER 1 REGISTER | " |
| COUNTER 2 REGISTER | number of formed ink droplets (for deflection detection) |
| CHARGE VOLT REGISTER 1 | charge voltage $V_{a1}$ actually applied to $20a_i$ for 1st deflection position |
| CHARGE VOLT REGISTER 2 | charge voltage $V_{a2}$ actually applied to $20a_i$ for 2nd deflection position |
| CHARGE VOLT REGISTER 3 | $S_{cc}$ charge voltage $V_{a3}$ actually applied to $20a_i$ for 3rd deflection position |
| ⋮ | ⋮ |
| CHARGE VOLT REGISTER 40 | charge voltage $V_{a40}$ actually applied to $20a_i$ for 40th deflection position |
| COEFFICIENT REGISTER | voltage $V_{m40}/V_{c40}$ indicated by count code of the counter 200b |
| COUNTER 4 REGISTER | number of $CK_1$ (for frequency division) |
| COUNTER 5 REGISTER | number of formed ink droplets (for switching charge voltage) |
| COUNTER 6 REGISTER | counted number of pulses $n_a$ ($n_{a11}-n_{a44}$) |

Figure 2E:
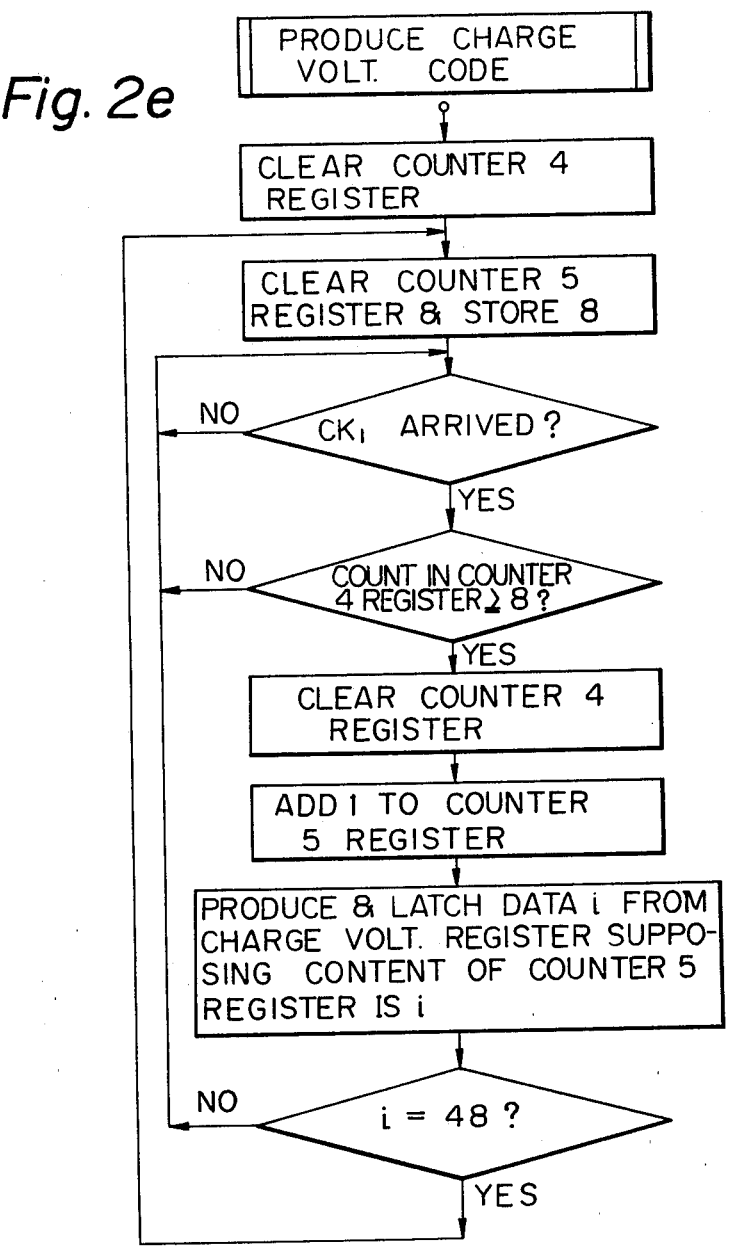
FIGS. 2e and 2j are flowcharts indicative of a charge voltage code producing procedure for printing.

Referring to the flowcharts of FIGS. 2f and 2d, deflection amount adjustment in the second embodiment will be described. Actions concerned with the central controller 240 in FIGS. 2a, 2b and 2e are similar to those mentioned in connection with the first embodiment and, therefore, will not be described any further. The central controller 240 in the second embodiment first resets the counter 200b, loads it with an ink pressure code determined by a set density, and supplies the monitor charging electrode $20a_m$ with the 40th step standard charge voltage. Under this condition, the reed relays OR of the deflection detectors 220a-220c are temporarily closed to make the capacitor C release the charge whereupon the count of ink droplets formed is started. As this count reaches a predetermined number, the central controller 240 checks the output levels of the deflection detectors 220a-220c. If the output of the deflection counter 220b is "1", the deflection amount is determined short and the counter 200b is conditioned for an upcount mode to count up pulses $n_a$ ($n_{a11}-n_{a44}$) the number of which depends on a command positional accuracy and a set density. Then the central controller 240 again closes the relays LR of the deflection detectors 220a-220c for a moment, counts ink droplets formed, and checks the outputs of the deflection detectors 220a-220c upon increase in the count to the predetermined value. When the output level of the deflection circuit 220c is "1", the deflection amount is determined excessive and the counter 200b is conditioned for a downcount mode and supplied with pulses $n_a$.

A positional accuracy, a dot diameter and a 1-step amount of charge voltage variation in the second embodiment have a correlation as will be described in detail. Suppose that the amount of deflection is very small and the charge voltage is increased step by step. Then ink droplets will impinge on the electrode 80b at progressively elevated positions. Next to a position at a certain elevated level, an ink droplet will reach a position where it misses the electrode 80b. Let it be assumed that the deflection position is shifted by an amount $\Delta l$ by one step of charge voltage variation. Where the charge voltage is increased step by step as mentioned, a specific ink droplet caused to miss the electrode 80b by the final 1-step increase in the charge voltage will have deflection position within the hatched area of FIG. 3. More specifically, said particular deflection position lies in the range from one P1 which is close to but clear of the extreme end of the electrode 80b to one P2 which is spaced a distance $\Delta l$ from a position which slightly touches the extreme end of the electrode 80b. This particular range has a center which is $r+\Delta l/2$ distant from the extreme end of the electrode 80b where r indicates a radius of an ink droplet; the range concerned is expressed as $\pm\Delta l/2$ stretching on opposite sides of the center. As will be noted, the amount $\Delta l$ is proportional to $n_a$ ($n_a=n_{a11}, n_{a12}, \ldots n_{a44}$). Accordingly, the center $r+\Delta l/2$ and range $\pm\Delta l/2$ of a predetermined deflection position are determined at least by the amount of final charge voltage adjustment ($n_a$). If the ink pressure and temperature are constant and the drive voltage is constant, the radius r of dots is constant and, therefore, ink droplets involve an error of $\pm\Delta l/2$ in the deflection adjustment with the density assumed constant; the error is determined by the charge voltage variation amount $n_a$ of one step (i.e. $\Delta l$). The amount of deflection can be adjusted even with the electrode 80b (or 80c) only. In such a case, when the deflection detector 220b connected with the electrode 80b detects charging of ink droplets ("1" output), the counter 200b will be caused to operate in an upcount mode and the deflection adjustment is completed at the instant a "0" output appears from the deflection detector 220b. When conversely the charge voltage is progressively lowered from a predetermined high level, the counter 200b will be operated in its downcount mode before the deflection detector 220b detects charging ("0" output) and the adjustment will be completed at the instant the output of the detector 220b becomes "1". Even if the charge voltage is progressively lowered in the manner mentioned, the center of a deflection adjustment position is $r+\Delta l/2$ and the range is $\pm\Delta l/2$. Since the printing positional accuracy depends on the center $r+\Delta l/2$ and the range $\pm\Delta l/2$, 1-step amounts of charge voltage variation $n_a$ are determined in the second embodiment which provide required positional accuracies, in correspondence with dot diameters (i.e. recording densities) and the required positional accuracies. In the above embodiment, a pair of electrodes 80b and 80c face each other with a slit formed therebetween so that the electrode 80c may be hit against finally by an ink droplet in place of the electrode 80b. If this is the case, the center of the deflection adjustment position is again $r+\Delta l/2$ from the extreme end of the electrode 80c and the range is $\pm\Delta l/2$. Suppose that the slit gap between the electrodes 80b and 80c has a width L. Then the center $r+\Delta l/2$ and the range $\pm\Delta l/2$ of such a case may be rewritten as $L-(r+\Delta l/2)$ and $L-(r+\Delta l/2)\pm\Delta l/2$ individually with the extreme end of the electrode 80b as a reference. The slit gap L must be larger than $\Delta l+2r$, or one step of charge voltage variation might cause ink droplets impinging on the electrode 80b to shift directly onto the electrode 80c. Meanwhile, if $L-(r+\Delta l/2)-(r+\Delta l/2)$ is larger than zero, the center of the entire deflection adjustment based on the extreme ends of both of the electrodes 80b and 80c will become offset upward from $r=\Delta l/2$ and the range will have a stretch from r to $L-(r+\Delta l/2)+\Delta l/2$, that is, from r to $L-r$.

It will thus be understood that in the second embodiment the amount of charge voltage variation at each step in the adjustment of deflection amount is made constant ($n_a$) and, for this reason, $n_a$ is made the largest within a range of 1-step charge voltage variation amounts which satisfies a required positional accuracy.

Figure 4A:
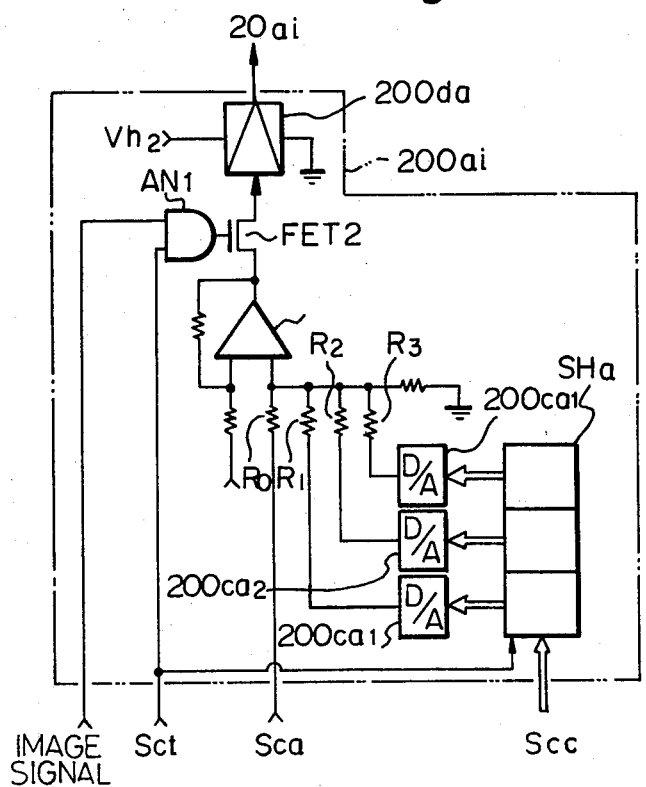
FIG. 4a is a block diagram of a print charge signal generator associated with an apparatus according to the present insertion.
Figure 4B:
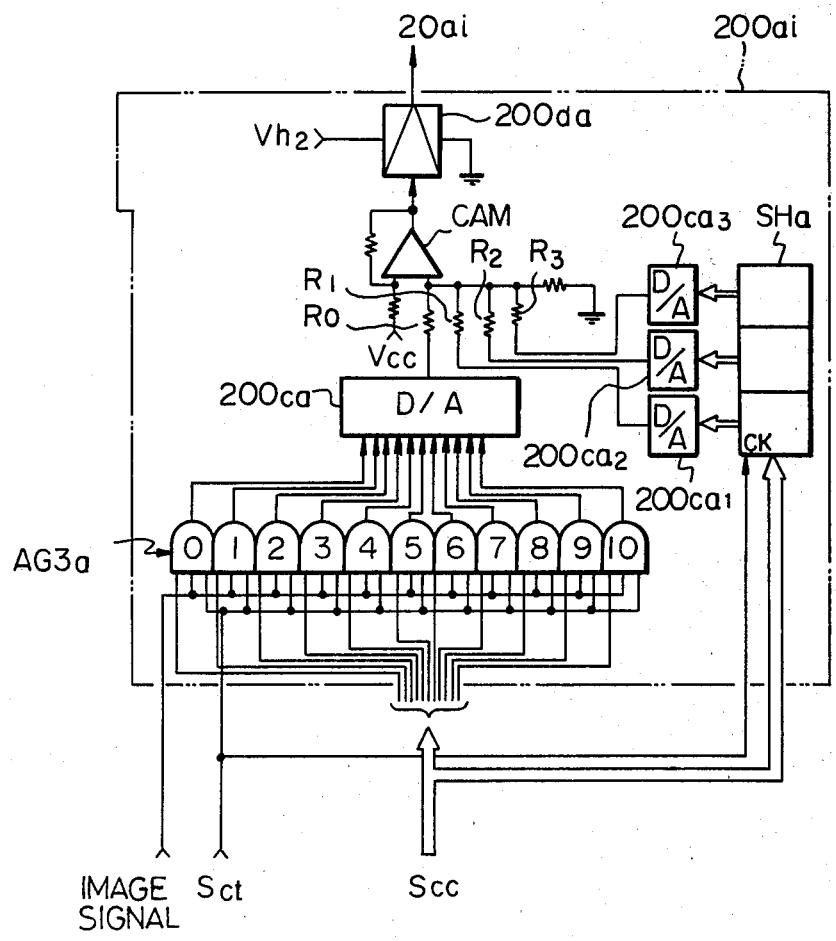

The third embodiment of the present invention outlined hereinbefore will be described in detail. Referring to FIGS. 4a and 4b, a charge voltage generator 200da is equipped with a 3-stage shift register SHa having eleven input/output bits and of the serial-in/parallel-out type. The shift register SHa is supplied with a charge voltage code $S_{cc}$ from the central controller 240 and shifted by a printing charge pulse (picture element synchronous pulse) $S_{ct}$ which appears in synchronism with the formation of one ink droplet. Thus, the first stage output of the shift register is a charge voltage code used for charging an immediately preceding ink droplet, the second stage output is a charge voltage code used for charging a second preceding droplet from the last, and the third stage output is a charge voltage code used for charging a third preceding droplet from the last. These output code signals are transformed by individual digital-to-analog converters $200ca_1$-$200ca_3$ into analog signals to be coupled to corresponding resistors $R_1$-$R_3$. A resistor $R_0$ is supplied with an analog version $S_{ca}$ of the current code. In this way, the respective resistors $R_0$-$R_3$ are supplied with an analog voltage $S_{ca}$ indicating a voltage to be applied to the head of the ink jet which is about to separate into a droplet, an analog voltage $S_{ca-1}$ determined the amount of charge on the immediately preceding ink droplet, an analog voltage $S_{ca-2}$ determined the charge amount on a second preceding droplet from the last, and an analog voltage $S_{ca-3}$ determined the charge amount on a third preceding droplet from the last, respectively. The resistors $R_0$-$R_3$ are connected to an adding input terminal of an operational amplifier CAM whose output analog voltage is therefore a voltage corresponding to $\alpha_0 S_{ca}+\alpha_1 S_{ca-1}+\alpha_2 S_{ca-2}+\alpha_3 S_{ca-3}$. The resistances $R_0$-$R_3$ are proportioned to one another based on a relation $0<\alpha_3/\alpha_0<\alpha_2/\alpha_0<\alpha_1/\alpha_0<1$. Indicated by $\alpha_1/\alpha_0$-$\alpha_3/\alpha_0$ are compensatory coefficients allotted to charges on ink droplets which precede one which is about to be separated from the ink jet; the compensatory coefficients are individually employed to make up for a distortion of the droplet now in separation attributable to the influence of the charges on the last droplet, second droplet from the last and third droplet from the last, relative to a currently applied charge voltage, that is, a deviation of charge amount on the droplet now in separation from a desired charge voltage. In this way, the third embodiment of the invention employs the operational amplifier CAM to compensate for a distortion of a charge on an ink droplet caused by the charges on the preceding three ink droplets. Even if a common charge voltage is supplied to the charging electrodes allotted to the individual printing nozzles, the nozzles cannot avoid an irregular distribution of deflection amounts because the charging characteristic may differ from one nozzle to another and because the deflecting electrodes $60a_j$ are not free from dislocation. With this inview, the adders or, more precisely, adder/subtractors each made up of the operational amplifier CAM and plural resistors have the resistors held in correspondence with the deflection characteristics of the recording nozzles $14a_i$ (i=1-41) with which the charge voltage generators $200a_i$ (i=1-41) are associated such that droplets of ink from the nozzles $14a_1$-$14a_{41}$ reach substantially the same positions (starting from the catches $70a_j$) if the input signals $S_{ca}$ and $S_{cc}$ are equal to each other. In short, the irregularity in deflection amount among the nozzles is compensated for by preselecting resistors of the adders included in the print charge signal generators $200a_i$.

Furthermore, in this third embodiment, each deflecting electrode $60a_j$ consists of a single metal sheet to have a thin configuration and thereby enlarge the gap between neighboring such electrodes. The adjacent deflecting electrodes are connected with terminals which receive voltages of the opposite polarities, respectively, Ink droplets ejected from adjacent nozzles are therefore subjected to deflecting electric fields of the opposite directions. To make the directions of deflection common despite such a situation, high voltage amplifiers 200da in the print charge signal generators 200a_i of the odd order (i=1, 3, . . . 41) are designed to produce outputs of a polarity opposite to that of the outputs of the high voltage amplifiers 200da in the print charge signal generators 200i of the even order (i=2, 4, . . . 40) so that ink droplets from neighboring nozzles are charged to the opposite polarities.

The central controller 240 stores in its read-only memory or ROM step compensatory coefficients Bi for the 1st to 40th steps of deflection. Regions of the ROM storing such data will be referred to as step compensatory memories 9-48 and indicated as STEP COM MEMORIES 9-48 in Table 5.

TABLE 5

| MEMORY REGION | STORED DATA |
| --- | --- |
| STEP COM MEMORY 9 | step com coefficient B9 |
| STEP COM MEMORY 10 | step com coefficient B10 |
| STEP COM MEMORY 11 | step com coefficient B11 |
| STEP COM MEMORY 11 | step com coefficient B11 |
| STEP COM MEMORY 11 | step com coefficient B11 |
| STEP COM MEMORY 11 | step com coefficient B11 |
| STEP COM MEMORY 11 | step com coefficient B11 |
| STEP COM MEMORY 48 | step com coefficient B48 |

The random access memory or RAM of the central controller 240 has preselected regions for temporary storage of data which will be called registers as in the first and second embodiments for convenience purpose. The registers referred to in the flowcharts of the drawings are concerned with the contents shown in Table 6.

Figure 2G:
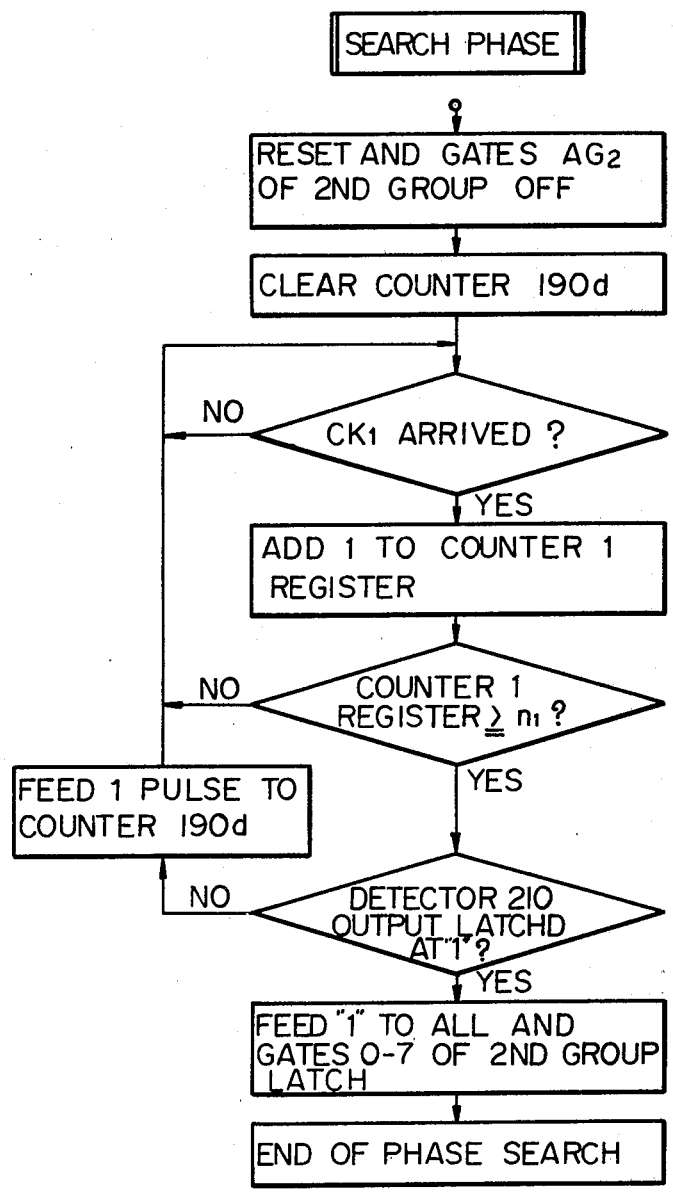
Figure 2H:
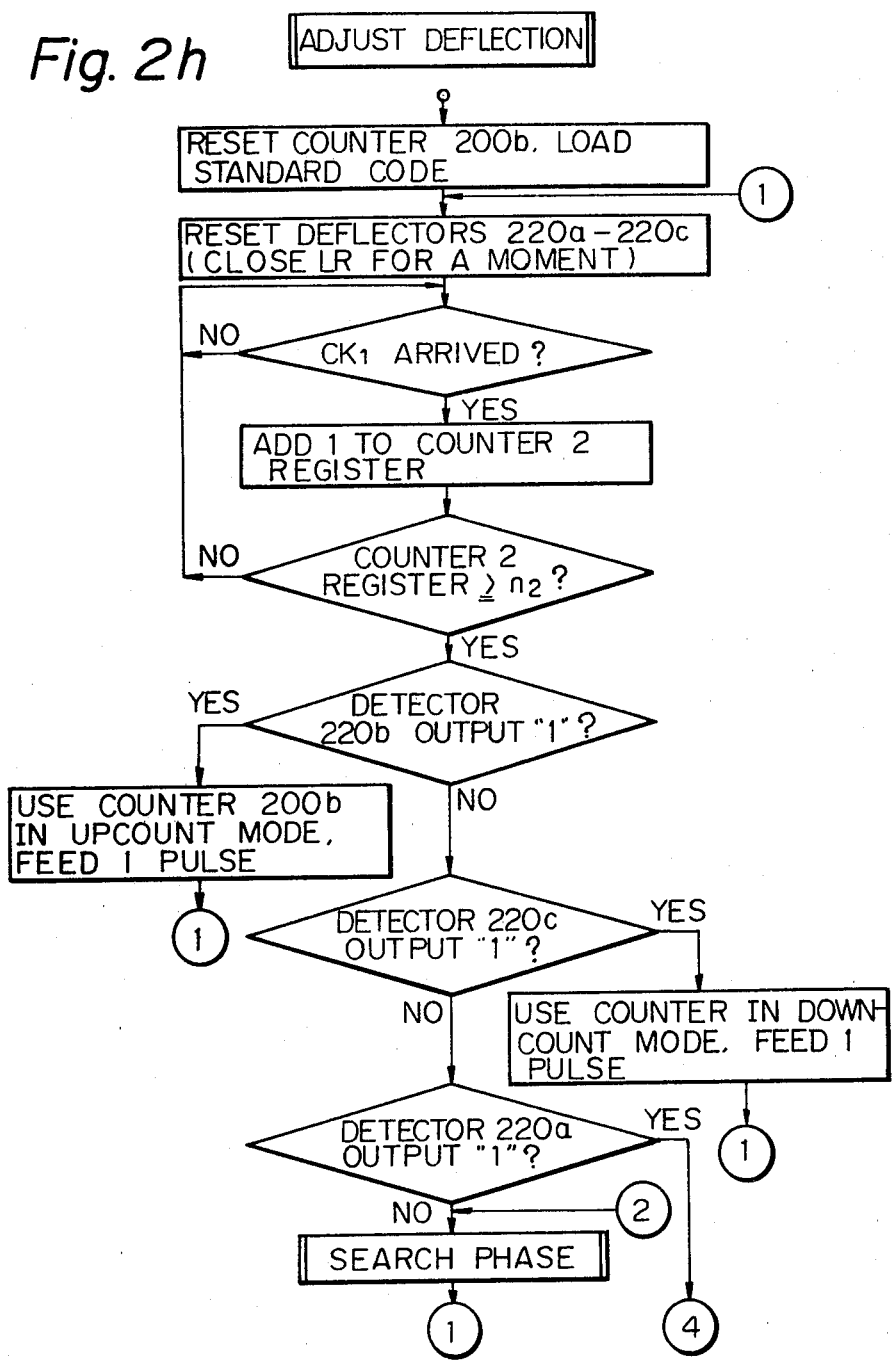
Figure 2I:
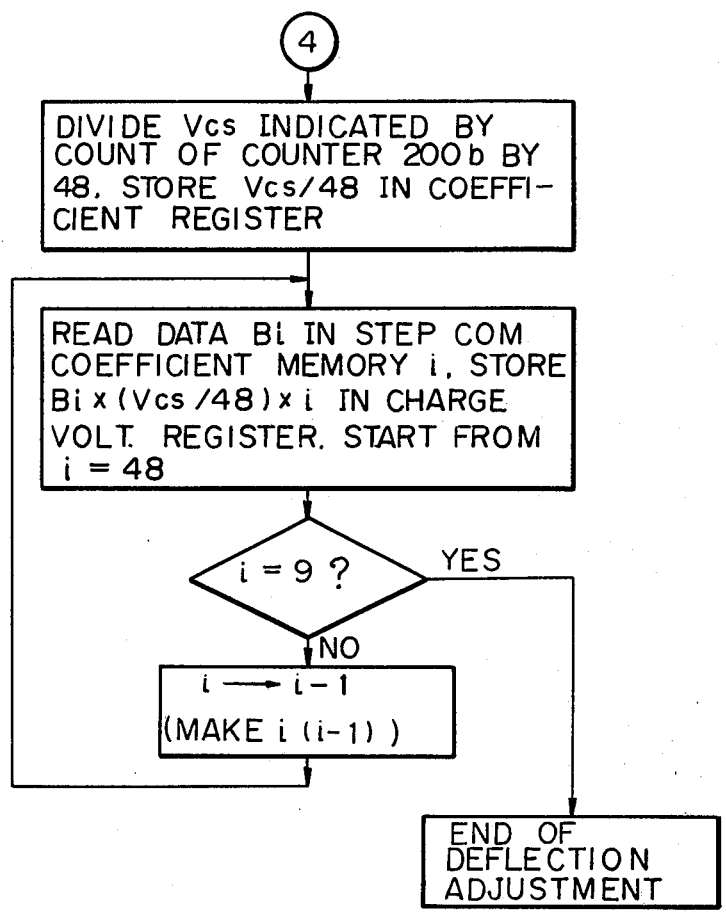
Figures 2, 2J:
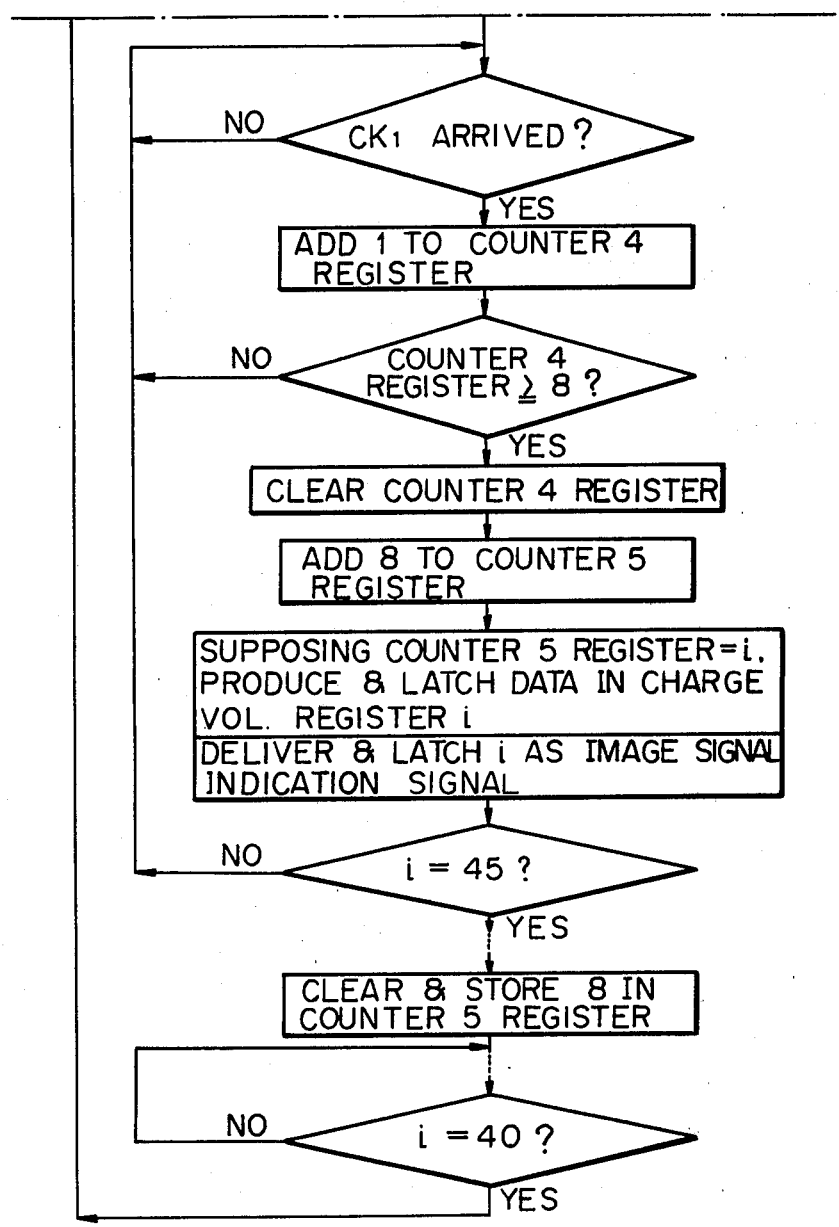
Figure 3:
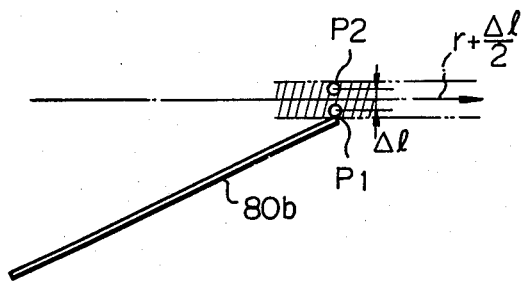
FIG. 3 shows in side elevation the relationship between one step of charging voltage variation and diameter of ink droplets adjustment.

The third embodiment searches a phase according to the flowchart of FIG. 2g, adjusts a deflection amount according to the flowchart of FIG. 2h, and produces a charge voltage code according to the flowchart of FIG. 2j.

Reference will be made to FIGS. 2h and 2i for explaining the operation of the third embodiment for adjusting the amount of deflection. The central controller 240 starts on this operation by resetting the counter 200b, loading the reset counter 200b with a command pressure code, and applying the 40th step standard charge voltage to the monitor charging electrode $20a_m$. Then it closes the reed relays LR of the deflection detectors for a moment to discharge the capacitor C and begins counting ink droplets formed.

Upon increase in the count to a predetermined number, the central controller 240 checks the output levels of the deflection detectors 220a-220c. If the output of the deflection detector 220b is "1", the deflection is judged short and the counter 200b is actuated into an upcount mode to count up "1". If the output of the deflection detector 220c is "1", the deflection is judged excessive and the counter 200b is conditioned for a downcount mode and supplied with one pulse to count it down. The central controller 240 again closes the relays LR of the deflection detectors 220a-220c for a moment, counts ink droplets formed, and determines the output levels of the deflection detectors 220a-220c when the count of the ink droplets coincides with the predetermined one. If the output of the deflection detector 220b is "1", the counter 200b counts up "1"; if the output of the deflection detector 200c is "1", the counter 200c counts down "1". The same procedure will be repeated thereafter. When the output level of the deflection detector 220a becomes "1" indicating an optimum amount of deflection, the central controller 240 determines the coefficient K as illustrated in FIG. 2d by dividing the charge voltage represented by the count code of the counter 200b by "48" which is the 40th step deflected position (spaced 6 mm from the straightforward point and, thus the 48th step as viewed from said specific point). Then the central controller 240 reads $B_{48}$ from the step compensatory memory 48 and stores in the charge voltage register 48 $B_{48} \cdot V_{c40} = B_{48} \cdot (V_{cs}/48 \times 48) = B_{48} \cdot V_{cs}$ where $B_{48}$ is "1". The central controller 240 reads $B_{47}$ from the step compensatory memory 47 and stores in the charge voltage register 47 $B_{47} \cdot V_{c39} = B_{47} \cdot (V_{cs}/48 \times 47)$ whereafter it reads $B_{46}$ from the step compensatory memory 46 and stores in the charge voltage register 46 $B_{46} \cdot V_{c38} = B_{46} \cdot (V_{cs}/48 \times 46)$. After a series of similar operations, the controller 240 finally reads $B_9$ from the step compensatory memory 9 and stores in the charge voltage register 9 $B_9 \cdot V_{cl} = B_9 \cdot (V_{cs}/48 \times 9)$. This completes the adjustment of deflection amount or charge voltage setting operation.

In printing operation, the central controller 240 sequentially produces and latches data stored in each of charge voltage registers 9-48 in timed relation with the production of one droplet of ink. Starting from the charged voltage register 9, the central controller 240 successively reads charge voltages $B_i \cdot V_{ci}$ out of the charge voltage registers in the order of ⑨-17-25-33-41- ⑬-21-29-37-45- ⑪-19-27-35-43- ①-⑤-23-31-39-47- ⑩-18-26-34-42- ⑭-22-30-38-46- ⑫--20-28-36-44- ⑯-24-32-40-48. These charge voltages are delivered individually as signals $S_{cc}$ from the central controller 240. Synchronized with the delivery of the signals $S_{cc}$, image signal indication codes corresponding

TABLE 6

Figure 5A:
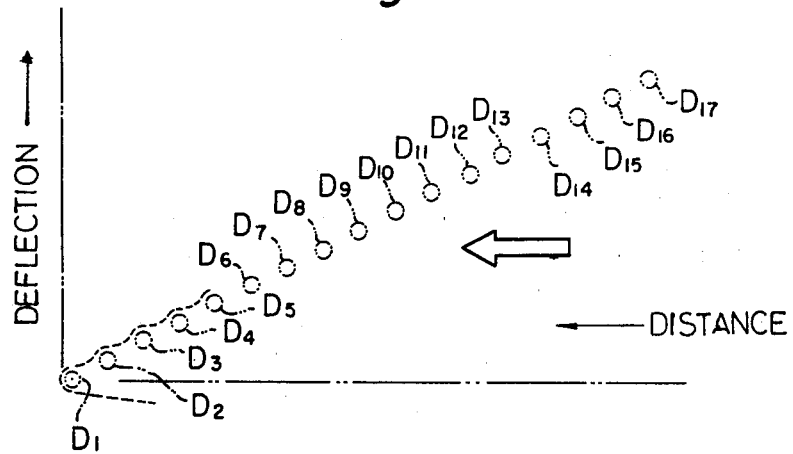
FIG. 5a shows in plan flying conditions of ink droplets according to one embodiment of the present invention.
Figure 5B:
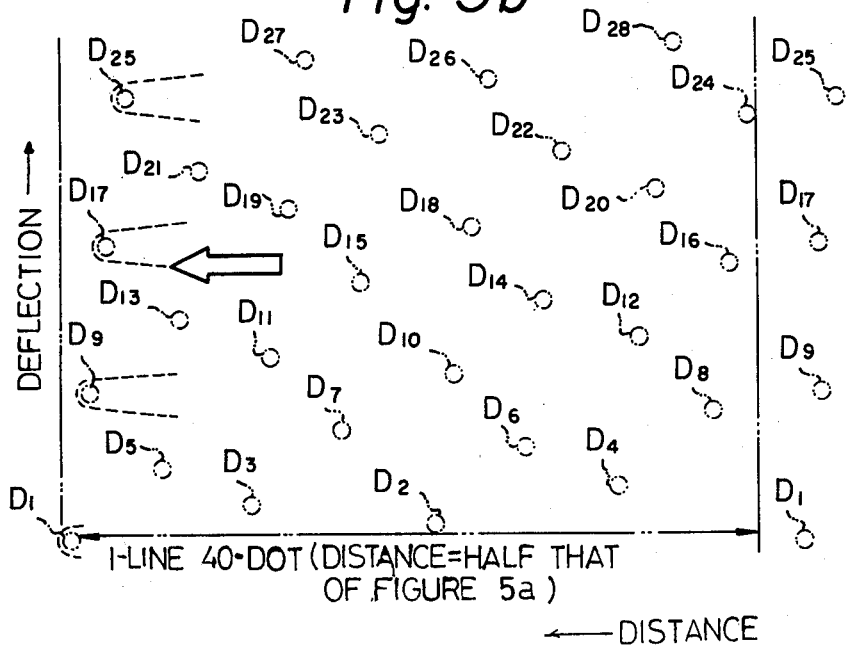
FIG. 5b shows in plan flying conditions of ink droplets according to another embodiment of the present invention.

| MEMORY REGION | READ/WRITE MEMORY DATA IN RAM CONTENT |
| --- | --- |
| TIMER 1 REGISTER | count of $CK_1$ for counting time |
| TIMER 2 REGISTER | " |
| COUNTER 1 REGISTER | " |
| COUNTER 2 REGISTER | number of formed ink droplets (for deflection detection) |
| CHARGE VOLT REGISTER 9 | charge voltage $B_9 V_{c1}$ actually applied to $20a_i$ for 1st deflection position |
| CHARGE VOLT REGISTER 10 | charge voltage $B_{10} V_{c2}$ actually applied to $20a_i$ for 2nd deflection position |
| CHARGE VOLT REGISTER 11 | $S_{cc}$ charge voltage $B_n V_{c3}$ actually applied tp $20a_i$ for 3rd deflection position |
| ⋮ | ⋮ |
| CHARGE VOLT REGISTER 48 | charge voltage $B_{48} V_{c40}$ actually applied to $20a_i$ for 40th deflection position |
| COEFFICIENT REGISTER | voltage $V_{cs}/48$ indicated by count code of counter 200b |
| COUNTER 4 REGISTER | number of $CK_1$ (for frequency division) |
| COUNTER 5 REGISTER | number of formed ink droplets (for switching charge voltage) | to the register Nos. (the registers 9-48 have correspondence with the 1st to 40th picture elements of a series of 40 picture elements) are supplied to the image signal delivery side. Such a supply of signals $S_{cc}$ and image signal indication codes constituting one 40-step cycle is repeated thereafter. Consequently, when the signal $S_{cc}$ is of a charge voltage generator (8+i) and coupled to the AND gates 0-10 of the AND gate group $AG_{3a}$, the i-th image signal of the continuous 1st to 40th (X direction) image signal ("1" recording and "0" nonrecording) is coupled simultaneously to the AND gates 0-10 of the same AND gate group $AG_{3a}$. Therefore, if the 1st to 40th image signals are all "1", ink droplets from a common nozzle will all be deflected not in the usual manner shown in FIG. 5a but in the unique skipping manner as represented by dots $D_1$-$D_{40}$ in FIG. 5b. The suffixes 1-40 in FIG. 5b indicate "i", i.e. image signal Nos. If an image signal j is "0", the resulting dot $D_j$ will not be charged and impinge on a catch $70a_l$ without flying in the manner shown in FIG. 5b.

In the above-described embodiment, $V_{cs}/48$ or K is determined first, then $V_{ci}=(V_{cs}/48) \times i$, and finally $Bi \times (V_{cs}/48) \times i$. However, such computation can be sufficed for simply by a single multiplication rewriting the charge voltage $Bi \times (V_{cs}/48) \times i$ as $(Bi \times i/48) \times V_{cs}$. For this alternative procedure, data $(Bi \times i/48)$ are stored in the individual step compensatory memories 9-48; voltages $V_{cs}$ are measured actually and multiplied by the data $(bi \times i/48)$ in the step compensatory memories to provide charge voltages $V_{cs}$ $(bi \times i/48)$ for the respective steps.

Furthermore, in the third embodiment described, the relationship between the charge voltage and deflection amount is actually measured on ink droplets ejected from a single monitoring hole whereupon, based on this relationship, charge voltages $Bi.V_{ci}$ for the 1st to 40th levels of deflection are determined to use them as the charge voltages for ink droplets produced from the other or recording holes. More precisely, the operational amplifiers CAM are associated with the individual nozzles as discussed to correct the charge voltages actually applied to the charging electrodes in accordance with the deflection characteristics of the nozzles, partly because the ink ejection characteristic may differ from one ink ejection hole to another and partly because the charging characteristic may also differ from one charging electrode to another. In a more preferable form of the third embodiment, the 40th level of deflection is measured actually on ink droplets ejected from each ink ejection hole and the maximum charge voltages on ink droplets from the holes other than the monitoring hole are also measured actually relative to a charge voltage on ink droplets from the monitoring hole, thereby determining compensatory coefficients $\alpha_j$ for the respective holes. These compensatory coefficients $\alpha_j$ are stored in the ROM of the central controller 240. The indepenent sets of charge voltage registers 9-48 of the RAM are allotted in one-to-one correspondence to the ink ejection holes to store the products of the compensatory coefficients $\alpha_j$ and charge voltages $Bi.V_{ci}$, i.e. $\alpha_j.Bi.V_{ci}$. In the "PRODUCE CHARGE VOLTAGE CODE" flow, the product $\alpha_j.Bi.V_{ci}$ for each ink ejection hole is produced and latched every time an ink droplet separates from the ink jet so as to supply a corresponding charging electrode $20_i$ with a voltage different from the others.

Where use is made of multiple microcomputers in one-to-one relation with the ejection holes, each microcomputer may receive a signal $S_{cc}=Bi.V_{ci}$ from the central controller 240 and, in turn, supply a corresponding print charge voltage generator $200a_i$ with the product $\alpha_j.S_{cc}$ of the input signal $S_{cc}$ and a compensatory coefficient for an ejection nozzle to which it is allotted. In this case, an arrangement may be made such that signals $S_{cc1}$-$S_{cc40}$ ($B_1.V_1$-$B_{40}.V_{40}$) are coupled from the central controller 240 to the respective microcomputers prior to printing operation while the microcomputers control the read-out of charge voltage codes $S_{cc1}$-$S_{cc40}$ and image signals. The operational amplifier CAM, shift register SHa and digital-to-analog converters $200ca_1$-$200ca_3$ in each print charge voltage generator $200a$ are omissible if each microcomputer is designed to process a charge voltage on an ink droplet in correspondence with those on the preceding ink droplets and supply its associated print charge voltage generator $200a_i$ with a corrected charge voltage code.

As will now be seen, the principles of the third embodiment consists in adjusting and setting charge voltages by detecting deflection positions of ink droplets, dividing the continuous 1st to 1-th (40th) deflection steps into multiple groups of discontinuous skipping steps during printing operation, and compensating for a deflection of a charge on an ink droplet attributable to the charges on the preceding droplets. Thus, ink droplets are deflected with a maximum of accuracy to print out quality data.

Hereinafter will be described other embodiments and modifications of the present invention. To summarize the first embodiment shown in FIG. 1a, a multi-nozzle head is utilized which has 42 ink ejection holes at common spacings of 5 mm to cover the entire width of a recording sheet. Each ejection hole is used to record data over a range of 5 mm width 40 dots (8 dots per mm). The head also has a single ink ejection hole for monitoring calibrated to eject ink under the same conditions as the 42 recording holes. Ink from this monitoring hole is constantly charged by a voltage which deflects it to the maximum deflection position (the 40th step of charging voltage). The deflected position of monitoring ink droplets is detected and, first, the charging voltage is adjusted so that the deflected position coincides with a predetermined point. If the position is out of an adjustable range, the pressure of the ink is varied. Based on the adjusted charging voltage, charging voltages (40 steps) for recording droplets are determined. A charge signal generator (FIG. 1b) for charging monitoring ink droplets is independent of a charge signal generator for recording ink droplets (42 generators having the construction shown in FIG. 1c or 1d).

Figure 6:
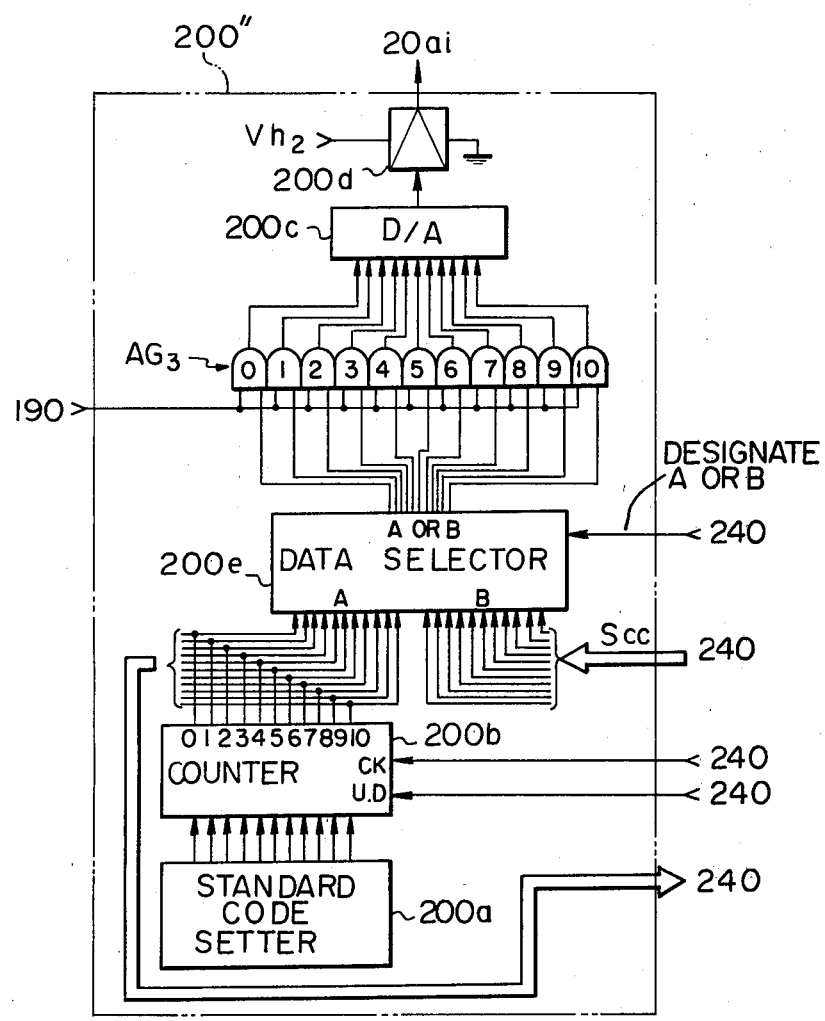
FIG. 6 is a block diagram showing a modified form of a charge voltage generator.

However, an ink jet recording apparatus may alternatively have a single nozzle head, or one deflection detecting electrode $80a$ for each of the recording ejection ports, or one or plural ink ejection ports for common use in ejecting recording ink and monitoring ink. In any of these cases, a single charge signal generator is usable for both monitoring and charging for recording. An example of such an arrangement is illustrated in FIG. 6. A charge signal generator 200" shown in FIG. 6 additionally includes a data selector $200e$ intervening between the counter $200b$ and the third group of AND gates $AG_3$. The data selector $200e$ receives at a terminal A the output count codes of the counter $200b$ and at an other input terminal B the output codes $S_{cc}$ of the central controller 240 indicative of the set charge voltages $V_{a1}$-$V_{a40}$. With this alternative design, the central controller 240 will supply the data selector $200e$ with a signal for designating the input terminal A during phase search and deflection adjustment and with a signal designating the other input terminal B during actual printing action.

Thus, the data selector 200e serves as a data selecting or switching means.

As will also be noted, the charge detecting electrodes 40$a_i$, 40$a_m$ and charge detector 210 installed in the embodiment shown in FIGS. 1a-1c may be omitted. Without these components, the controller 240 in the phase search (FIG. 2b) will close the relays RL of the deflection detectors 220a-220c a moment after clearing the counter 190d and then start counting the droplets of ink formed. As this count reaches a predetermined value, the controller 240 will check the output levels of the deflection detectors 220a-220c and, if one of said output levels is "1", complete the phase search but, if all of said output levels are "0", it will reset the deflection detectors 220a-220c and feed one pulse to the counter 190d. Such a procedure will be repeated until one of the output levels of the deflection detectors 220a-220c becomes "1".

While the various embodiments of the present invention have been shown and described as employing three electrodes 80a-80c for the detection of deflection positions of ink droplets, it will be apparent that the present invention is operable likewise effective even with one or two of them omitted.

Figure 7:
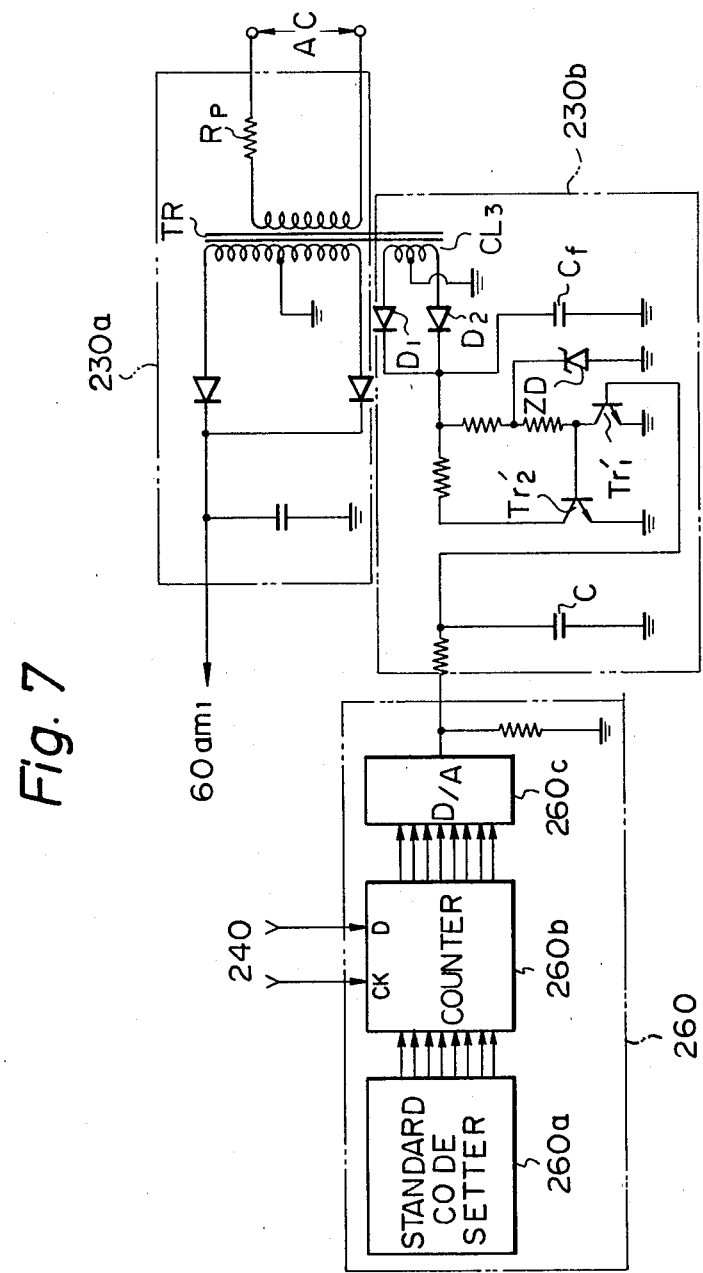
FIG. 7 is a circuit diagram of a power source of the present invention and adapted to provide deflection voltage.

Turning to FIG. 7, there is shown a deflection voltage power source device applicable to one embodiment of the present invention which adjusts the amount of deflection by adjusting the deflection voltage. The power source device shown in FIG. 5 comprises a power supply circuit 230a, a voltage control circuit 230b and a voltage setting circuit 260. The voltage control circuit 230b is made up of a coil CL$_3$ wound round the iron core of a transformer TR included in the booster 230a, diodes D$_1$ and D$_2$, a smoothing capacitor C$_f$, a Zener diode ZD, transistors Tr$_1'$ and Tr$_2'$, a capacitor C$_0$ and a resistor R$_p$. The collector voltage of the transistor Tr$_1$ is kept constant by a Zener diode ZD so that a rise of the base voltage of the transistor Tr$_1$ increases the conductivity of the transistor Tr$_1$ and decreases the conductivity of the transistor Tr$_2'$ with the resultant decrease in the current flowing through the coil CL$_3$. In the circuit 230a, an increase in the current flowing through the coil CL$_3$ promotes a voltage drop at the resistor R$_p$ at the primary side and thereby lowers the secondary voltage. A decrease in the current through the coil CL$_3$ elevates the secondary voltage. More specifically, as the base voltage of the transistor R Tr$_1$ rises, the high tension output of the circuit 230a rises to boost the deflection voltage whereby ink droplets are significantly deflected. The voltage setting circuit 260 comprises a standard code setter 260a, an up-down counter 260b and a digital-to-analog converter 260c. A standard code is set as a deflection voltage code which causes ink droplets charged to the 40th step to always impinge on the electrode 80a. In this embodiment, while the electrode 80b or 80c is detecting ink droplets, the counter 260b is operated in the upcount mode or in the downcount mode and supplied with pulses.

Generally, charging voltages are far higher than deflecting voltages and, in this respect, adjustment of the latter is comparatively rough. Thus, it is preferable to combine the variation of the charge voltage and that of the deflection voltage. For example, the deflection voltage may be adjusted first and then the deflection voltage when the charge voltage varies beyond a predetermined range.

While the present invention has been shown and described in connection with specific constructions and arrangements, they are not for restrictive purpose but only for illustrative purpose and various other constructions and arrangements are possible. For example, the counter 160b and standard code setter 160a of the pressure setting circuit 160 and the counter 260b and standard code setter 260a of the voltage setting circuit may be omitted altogether and their functions may be allotted to the microcomputer of the controller 240 for instance. The same holds true concerning the counter 200b, standard code setter 200a, second group of AND gates AG$_3$ and data selector 200e included in the charge signal generator 200. Additionally, the microcomputer may take charge of the function of the phase setting circuit 190.

Moreover, use may be made of an ink jet head of any other single nozzle type or multi-nozzle type in place of the head 10 shown in FIG. 1a. An example is a head having a plurality of cylindrical electrostrictive vibrators which are common in number to the nozzles and each having one ink ejection port at its leading end while being communicated with a common ink passage of the head at one end thereof. Another example is a head having cylindrical electrostrictive vibrators which are spaced from a pressurized ink box and communicated therewith by pipes and mounted on a fixed support or an ejection direction adjusting base.

Various modifications will become possible for those skilled in the art after receiving the teachings of the present disclosure without departing from the scope thereof.

What is claimed is:

1. An ink jet printing apparatus comprising:
   an ink ejection head having a plurality of nozzles each for ejecting a jet of ink;
   charging means for electrostatically charging the ink jet;
   deflection position control means adapted to repeat detection and adjustment of a deflection position a plurality of times; and
   control means for controlling at least one of the charging means and deflecting means to adjust a voltage level which determines an amount of the deflection of the ink jet;
   the voltage level which determines an amount of deflection being variable;
   the amount of variation of the voltage level decreasing progressively as the deflection adjustment is repeated.

2. An apparatus as claimed in claim 1, in which assuming that the amounts of voltage level variation at the deflection adjustment of the first time, second time, third time . . . are V$_{k1}$, V$_{k2}$, V$_{k3}$ . . . , said amounts are predetermined to satisfy a relation;

$$V_{k1}=2V_{k2}=4V_{k3}=8V_{k4}\ldots.$$

3. An apparatus as claimed in claim 1, in which droplets separated from the ink jet are charged not in a continuous manner but in groups of multiple skipped steps.

4. An apparatus as claimed in claim 1, in which a deflection of a charge on a droplet separated from the ink jet attributable to charge voltages on the preceding droplets of ink is compensated for.

5. An ink jet printing apparatus comprising:
   an ink ejection head having a plurality of nozzles each for ejecting a jet of ink;

charging means for electrostatically charging the ink jet;

deflection position control means adapted to repeat detection and adjustment of a deflection position a plurality of times; and control means for controlling at least one of the charging means and deflecting means to adjust a voltage level which determines an amount of deflection of the ink jet;

the voltage level which determines an amount of deflection being variable;

the amounts of voltage level variation being determined in accordance with the diameters of droplets separated from the ink jet.

* * * * *